United States Patent
Nakata et al.

[11] Patent Number: 5,693,174
[45] Date of Patent: Dec. 2, 1997

[54] APPARATUS FOR ATTACHING A MOLDING

[75] Inventors: Shuichi Nakata, Kariya; Shirou Takayama, Tanaka-machi; Hideo Yamada, Nagoya; Ryuji Souma; Kozo Fukuda, both of Aichi-ken; Tomohiro Morishita, Kakogawa; Yoshikazu Tojo, Handa; Rinzo Watanabe, Toyoake; Mikimasa Matsui, Aichi-ken; Yukio Fukuoka, Toyoake; Yasutaka Shioji, Aichi-ken, all of Japan

[73] Assignees: Toyoda Koki Kabushiki Kaisha, Kariya; Cyubu Kogyo Kabushiki Kaisha, Toyota, both of Japan

[21] Appl. No.: 362,871

[22] Filed: Dec. 23, 1994

[30] Foreign Application Priority Data

Dec. 24, 1993 [JP] Japan ............................. 5-327967
Sep. 27, 1994 [JP] Japan ............................. 6-231299

[51] Int. Cl.⁶ ............................. B29B 47/92; B29C 31/00
[52] U.S. Cl. ............................. 156/361; 156/498; 156/500; 156/510; 156/538; 156/569
[58] Field of Search ............................. 156/108, 109, 156/244.11, 244.18, 244.27, 308.2, 309.9, 311, 500, 510, 538, 569, 361, 498, 499; 264/252; 425/110, 113; 296/96.21, 201; 52/204.597, 204.595, 208; 24/243.5, 796, 789, 790; 226/104, 118, 119

[56] References Cited

U.S. PATENT DOCUMENTS

| | | | |
|---|---|---|---|
| 2,556,775 | 6/1951 | Oswald | 52/208 |
| 2,646,378 | 7/1953 | Morin . | |
| 2,667,951 | 2/1954 | Gall | 52/204.597 |
| 2,840,869 | 7/1958 | Fegan | 52/208 |
| 3,177,749 | 4/1965 | Best et al. | 226/118 |
| 3,239,402 | 3/1966 | Ecklund et al. . | |
| 3,475,255 | 10/1969 | Lang | 226/118 |
| 3,706,173 | 12/1972 | Taylor | 156/244.18 |
| 3,927,587 | 12/1975 | Jackson et al. | 83/881 |
| 4,109,432 | 8/1978 | Pilz | 156/109 |
| 4,933,032 | 6/1990 | Kunert . | |
| 5,057,265 | 10/1991 | Kunert et al. . | |
| 5,095,669 | 3/1992 | Kunert et al. . | |
| 5,237,730 | 8/1993 | Goedder | 29/243.5 |
| 5,392,977 | 2/1995 | Kato | 226/118 |
| 5,411,696 | 5/1995 | Ito et al. | 264/252 |

FOREIGN PATENT DOCUMENTS

| | | |
|---|---|---|
| 0 073 350 | 3/1983 | European Pat. Off. . |
| 0 122 636 | 10/1984 | European Pat. Off. . |
| 0 175 981 | 4/1986 | European Pat. Off. . |
| 0 493 068 | 7/1992 | European Pat. Off. . |

OTHER PUBLICATIONS

Patent Abstracts of Japan, vol. 012, No. 126, Apr. 19, 1988, JP-A-62 251229, Nov. 2, 1987.

*Primary Examiner*—Richard Crispino
*Attorney, Agent, or Firm*—Oblon, Spivak, McClelland, Maier & Neustadt, P.C.

[57] ABSTRACT

An apparatus for attaching a molding to the peripheral edge of an article such as a glazing used in an automobile. A molding having a groove in its one side is extruded from an extruder. The molding is guided so that the leading end of the molding contacts the edge of an article which is held by a robot. The groove of the molding is expanded by a guide section, and the edge of the glazing enters the groove thus expanded. The robot then rotates the glazing, while pressure is applied to the molding so that the molding adheres to the glazing. When the glazing is rotated one turn, the molding is cut. The molding may be heated from the side having the groove, and cooled from the opposite side having a lip. This facilitates the attachment of the molding without causing any deterioration of the shape of the lip.

7 Claims, 23 Drawing Sheets

F I G. 6
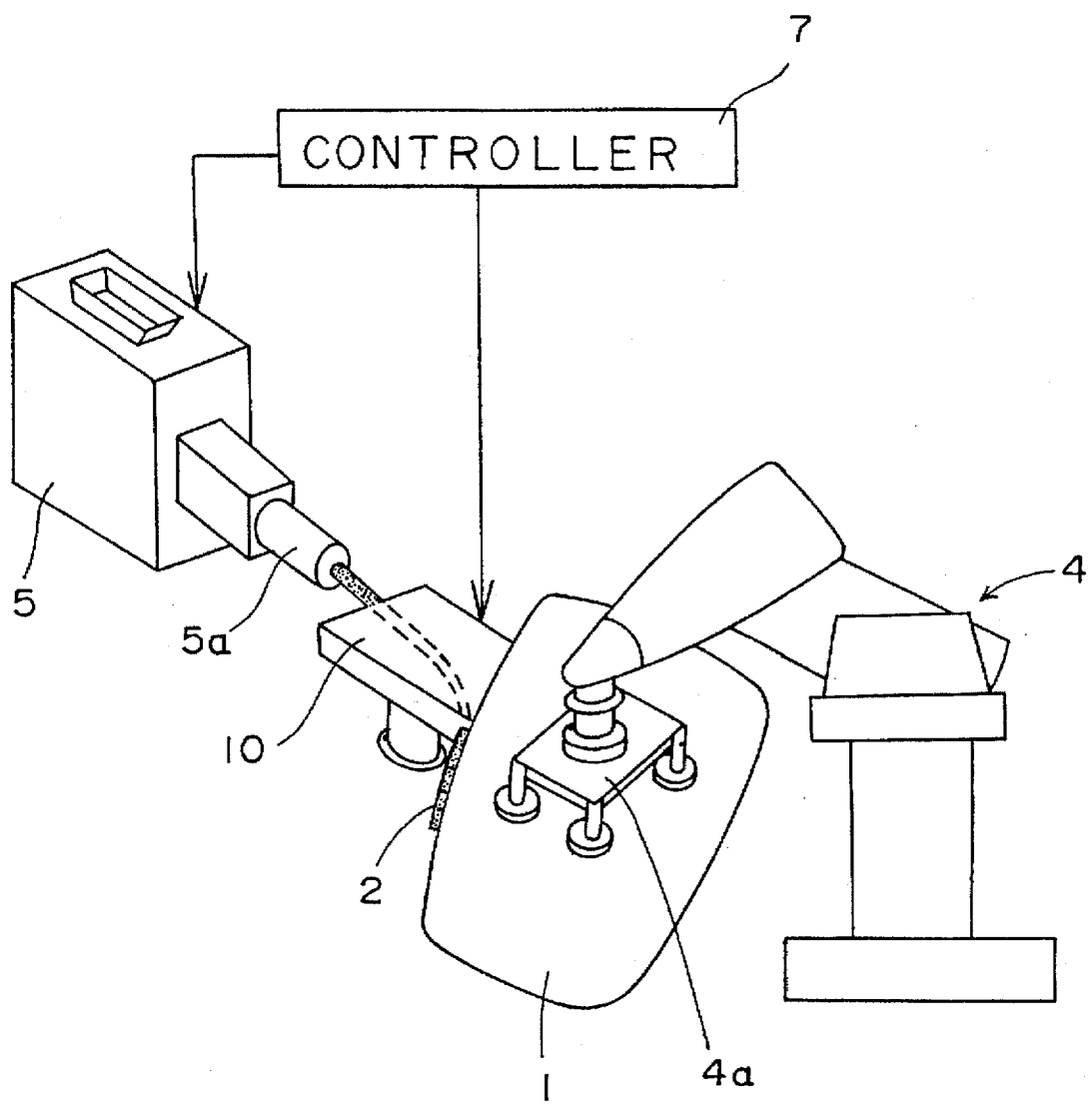

APPARATUS FOR ATTACHING A MOLDING

BACKGROUND OF THE INVENTION

1. Field of the Invention

The present invention relates to a method and apparatus for attaching a molding along the periphery of an article, such as a glazing for a front windshield, side window or rear windshield of an automobile.

2. Discussion of Related Art

To attach a glazing to a window frame of the body of an automobile, a molding made of a resin is first attached to the periphery of the glazing for secure attachment of the glazing and for watertightness. The glazing with the molding is then attached to the window frame of the body.

Conventionally, the following various methods have been proposed to attach a molding to the periphery of a glazing. However, these methods have drawbacks which will be described after the respective methods.

Method 1:

A molding having a shape fit to the peripheral shape of a glazing is previously manufactured, and is then manually attached to the glazing by a worker.

Since this method requires two separate steps, i.e., the step of manufacturing a molding and the step of attaching the molding to a glazing, a prolonged period of time is required for the assembly of the glazing, leading to an increase in production costs. Especially, the step of attaching the molding to the glazing, which is carried out manually, suffers from a low operating efficiency and insufficient accuracy in the shape of the completed glazing with the molding attached. Moreover, in the case where a straight molding is used, crinkles are generated at the four corners of the glazing when the molding is attached to the periphery of the glazing. This deteriorates the appearance of the glazing. A method used to solve this problem is to separately form special moldings for the corners or to form a molding having a substantially rectangular shape corresponding to the peripheral shape of a glazing, and then attach such a molding to the glazing. However, these moldings increase costs and require a troublesome molding operation.

Method 2:

As shown in FIG. 1, a glazing 1 is placed in a mold 3 into which a resin is thereafter injected from an unillustrated injection molding machine through an injection port 3a so as to integrally form a molding 2 along the periphery of the glazing 1.

This method requires a large injection molding machine as well as a large mold, leading to an increase in the size of the manufacturing facility. In addition, since a mold is needed for each of the shapes of various glazings, the production costs increase. Moreover, the high molding pressure which is required causes a glazing to crack if it is made of glass having a low strength, such as laminated glass.

Method 3:

As shown in FIG. 2, a general purpose robot 4 provided with a gun 6 at the leading end of its hand is used. The gun 6 has an outlet having a shape corresponding to the cross section of a molding to be formed. A fluid resin is supplied from an extruder 5 to the gun 6 while the gun 6 is moved by the robot 4 along the periphery of the glazing 1, which is supported by a holding table 7. With this operation, the molding 2 is automatically formed and adhered to the glazing 1.

This method is advantageous because the facility can be made smaller, and the formation of the molding 2 and the attachment of the molding 2 to the glazing 1 can be performed in a single step. However, although the molding 2 can be formed such that it adheres to one side of the glazing 1, as shown in FIG. 3, the molding 2 cannot be formed to cover the edge surface of the glazing 1, as shown in FIGS. 4 and 5.

SUMMARY OF THE INVENTION

An object of the present invention is to provide an improved method and apparatus for automatically forming and attaching a molding along an edge of an article, such as a glazing, such that the molding covers the edge of the article.

Another object of the present invention is to provide an improved method and apparatus for facilitating the attachment of a molding to an article by maintaining the thermoplasticity of the molding during the attachment of the molding to the article, while maintaining the shape of the molding.

In the present invention, a molding having an attaching portion to be adhered to an edge of an article is led to a predetermined position so that the leading end of the attaching portion of the molding contacts the edge of said article at an attachment start position. Then, pressure is applied to the molding such that the attaching portion of the molding adheres to the edge of said article, and the article is moved so that the molding is attached along the edge of said article over a predetermined length. The molding is thereafter cut to complete the attaching operation.

Accordingly, the molding can be attached to the article such that it covers the edge of the article.

The molding supply apparatus may be an extruder which supplies a resin molding in a state in which the resin has not hardened completely.

In this case, the molding can be smoothly attached to an article even at its corners due to the flexibility of the molding, providing an excellent appearance. Since the molding is molded by a mold in the extruder, it is easy to form the molding in a shape suitable for covering the edge of the article.

Also, it is preferred that the molding be heated from the side of the attaching portion of the molding and be cooled from the side opposite to the attaching portion.

This facilitates the attachment of the molding to the article. Especially, the molding can be smoothly attached along the corners portions of the article because the flexibility of the attaching portion of the molding is maintained. In addition, since the opposite side of the molding where a lip or the like is formed is cooled, the shape of the molding at the opposite side, such as the shape of the lip is prevented from being deformed at the corner portions or due to contact with some object. In the case where the molding is adhered to the article via primer, the adhesive force can be increased because of an increased temperature of the attaching portion of the molding.

It is also preferred that a groove of the molding, which is formed to receive the edge of the article, be expanded before attaching the molding to the article. This guarantees the secure attachment of the molding.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 6 is a perspective sectional view showing the overall structure of a molding attaching apparatus according to a first embodiment of the present invention;

FIG. 10 is a view showing the second roller of the attaching head shown in. FIG. 7;

DESCRIPTION OF PREFERRED EMBODIMENTS

Embodiments of the present invention will now be described with reference to the accompanying drawings.

First Embodiment

Figure 15:
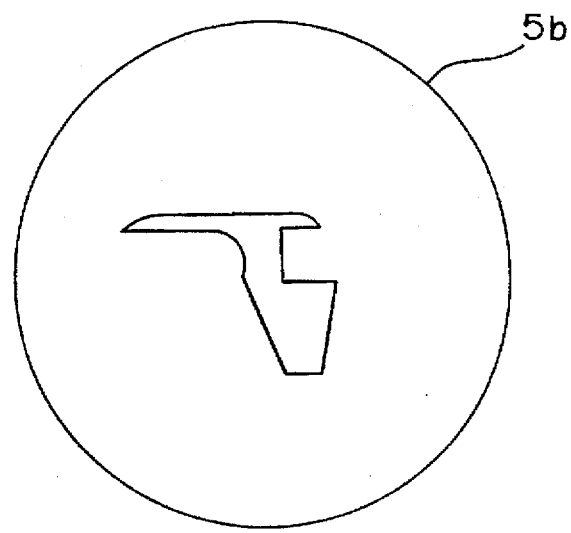
FIG. 15 is an illustration showing a mold used for making a molding.

FIG. 6 is a perspective view showing the overall structure of a molding attaching apparatus according to a first embodiment of the present invention. The molding attaching apparatus is mainly composed of a robot 4 an extruder 5, an attaching head 10, and a controller 7. The robot 4 is a general purpose 6-axis robot with a hand and is a means for causing relative movement of the article with respect to the attaching head 10. A sucker 4a is attached to the hand so as to suck and support a glazing 1. No limitation is imposed on the glazing 1, and the glazing 1 may be made of toughened glass, laminated glass, or the like. The extruder 5 supplies a molding 2 to be attached along the periphery of the glazing 1. A mold 5b shown in FIG. 15 is attached to a resin supply port 5a to form the molding 2 by extrusion molding. When the resin is pushed out of the supply port 5a, the resin becomes the molding 2 having a desired shape. The molding 2 is provided on its one side with a groove 2a serving as an attaching portion into which the glazing 1 is fitted. A lip 2b having a small thickness is formed on the side of the molding 1 opposite to the groove 2a. The latter side will hereinafter be referred to as the "non-attaching side". The resin used here is a thermoplastic resin such as vinyl chloride. The resin becomes liquid when heated in the extruder 5 and hardens when cooled to an ordinary temperature. However, the resin or the molding 2 has not hardened completely and has plasticity from the time when the molding 2 is extruded from the supply port 5a to the time when the molding 2 is attached to the glazing 1 by the attaching head 10. The thermoplastic resin has a property such that it hardens and its plasticity decreases when it cools to room temperature. The present invention utilizes such a property of the thermoplastic resin. In detail, the molding 2 is attached to the glazing 1 while the molding 2 maintains a high plasticity. This realizes smooth attachment without generating crinkles at the four corners of the glazing 1.

The robot 4, the attaching head 10 and the extruder 5 are controlled by the controller 7. The robot 4 is controlled to insert a peripheral portion of the glazing 1 held by the robot 4 into the attaching head 10 and then rotate the glazing 1 such that the attaching head 10 relatively moves along the periphery of the glazing 1. Japanese Patent Application Laid-open No. 2-82302 discloses the technique used herein. In the technique, an article held by a robot is moved relative to a fixed tool such that the fixed tool (the mounting head 10 in the present embodiment) relatively moves along the periphery of an article (the glazing 1 in the present embodiment).

Figure 7:
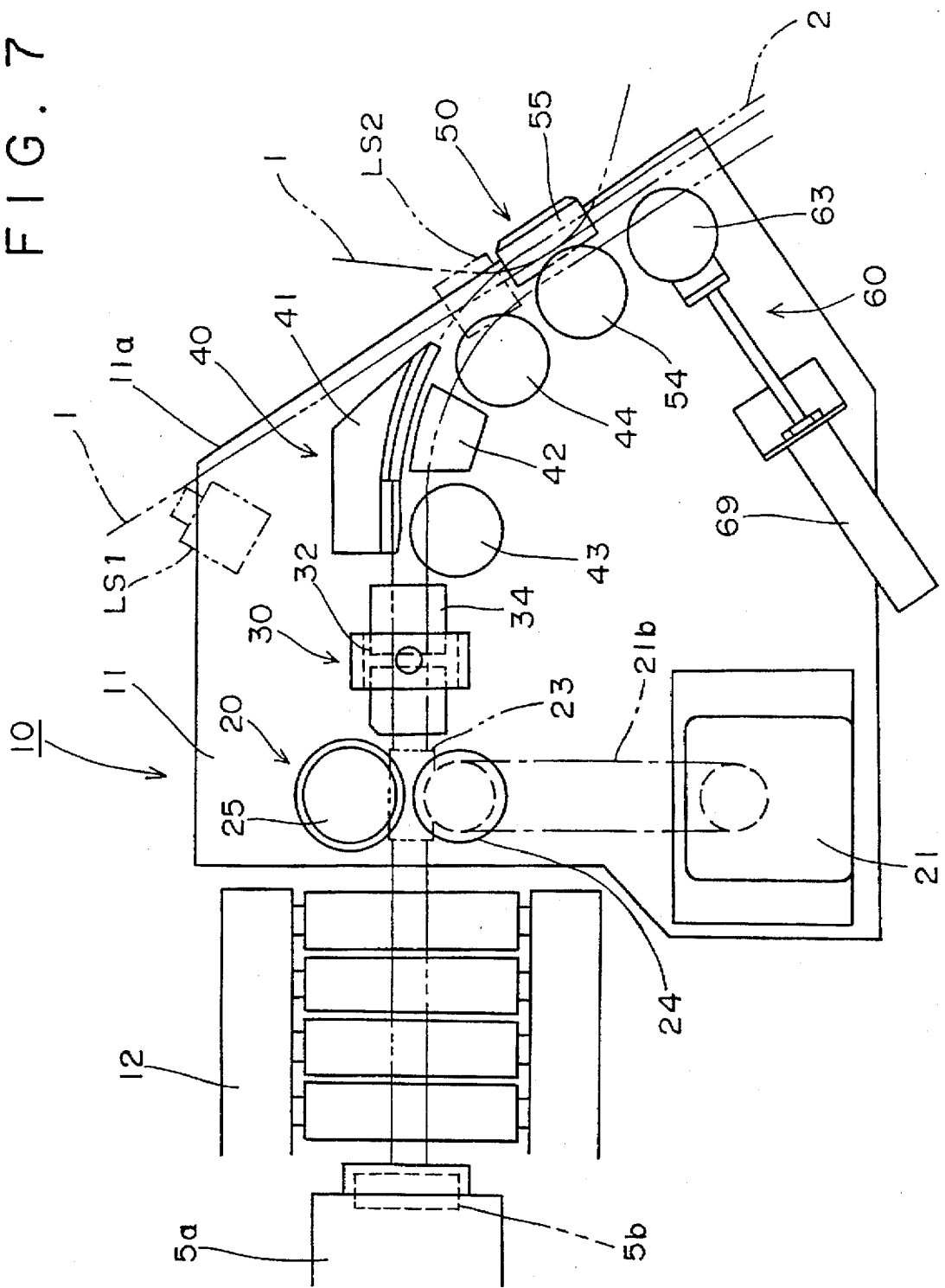
FIG. 7 is a plan view showing the attaching head of the molding attaching apparatus shown n FIG. 6.

The structure of the attaching head 10 will be described in detail with reference to FIGS. 7 through 14. As shown in FIG. 7, the attaching head 10 is fixed to a floor surface and includes an inserting unit 20, a cutting unit 30, a first guide section 40, a pressing section 50 and a second guide section 60 which are disposed on a base plate 11. The base plate 11 has a slanted side 11a which facilitates the guide of the glazing 1. Numeral 12 denotes a roller guide for guiding the molding 2 which is extruded from the extruder 5 toward the attaching head 10. The inserting unit 20 compulsorily feeds the molding 2 into the attaching head 10. The cutting unit 30 cuts the molding 2 in a predetermined length. The first guide section 40 serves to expand a groove 2a (see FIG. 4) of the molding 2 which receives the edge of the glazing 1. The pressing section 50 serves to attach the molding 2 to the glazing 1 such that the edge of the glazing 1 enters the groove 2a, and to press the molding 2 for adhesion to the glazing 1. The second guide section 60 serves to smoothly move the molding 2 along the glazing 1 while securing the adhesion of the molding 2 to the glazing 1.

The structures of the above described units and sections will now be described.

Figure 8:
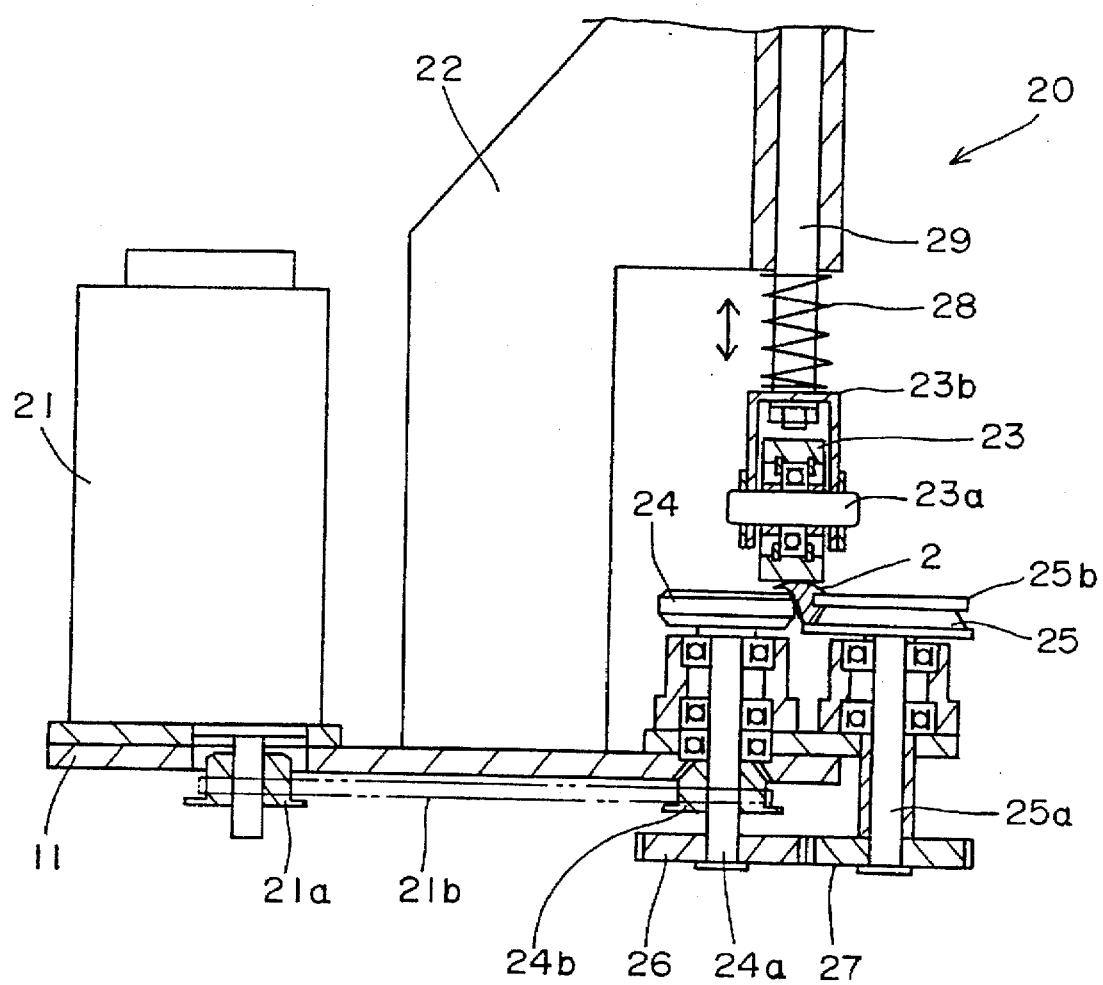
FIG. 8 is a partially sectioned view showing the inserting unit of the attaching head shown in FIG. 7.

As shown in FIG. 8, the inserting unit 20 includes a first horizontal roller 24, a second horizontal roller 25, and a vertical roller 23. The first horizontal roller 24 is supported by a rotary shaft 24a having a pulley 24b. The pulley 24b is drivingly connected to a pulley 21a of a motor 21 via a belt 21b. The motor 21 is of a speed variable type and is controlled to rotate at a speed corresponding to the extrusion speed of the extruder 5. The second horizontal roller 25 is supported by a rotary shaft 25a. A gear 26 fixed to the lower end of the rotary shaft 24a of the first horizontal roller 24 is meshed with a gear 27 fixed to the lower end of the rotary shaft 25a. Accordingly, the second horizontal roller 25 rotates synchronously with the first horizontal roller 24 in a direction opposite to the rotational direction of the first horizontal roller 24. The second horizontal roller 25 is provided with a groove engagement portion 25b which enters the groove 2a of the molding 2 with a predetermined gap so as to maintain the shape of the groove 2a. The vertical roller 23 is rotatably supported by a horizontal shaft 23a carried by the support member 23b. The support member 23b is fixed to a vertical shaft 29 which is slidably guided by the column 22. A spring 28 disposed between the support member 23b and the column 22 allows the vertical roller 23 to effect floating movement in accordance with changes in the vertical position of the upper surface of the molding 2 extruded from the extruder 5.

Figure 9A:
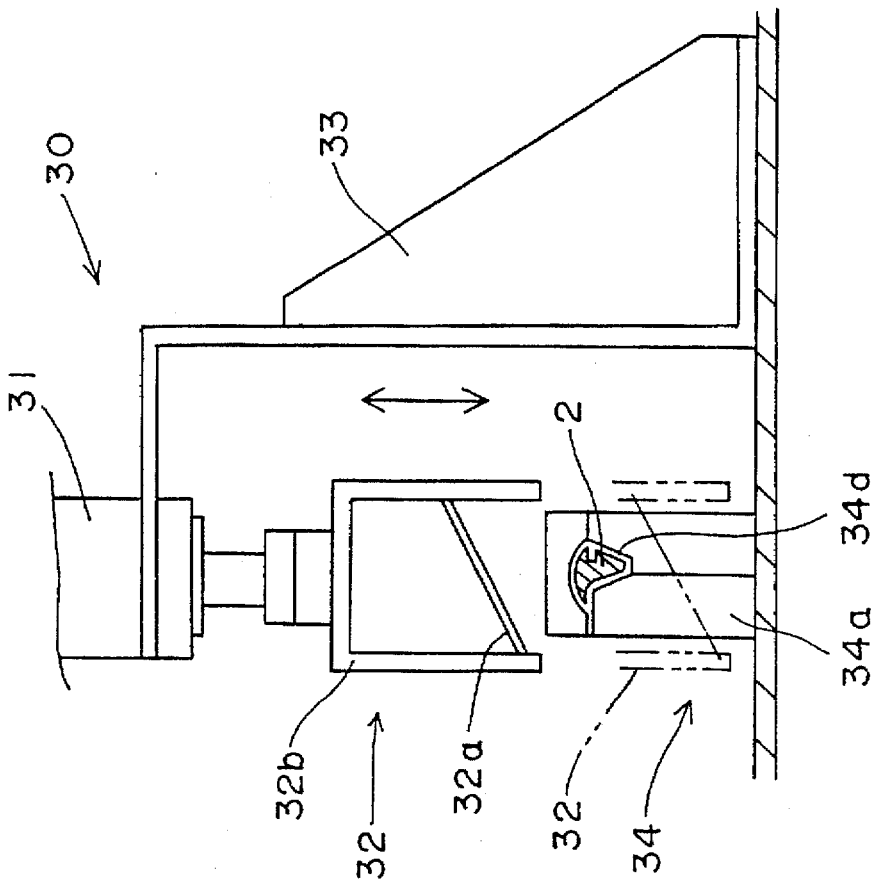
FIGS. 9A and 9B are views showing the cutting unit of the attaching head shown in FIG. 7.
Figure 9B:
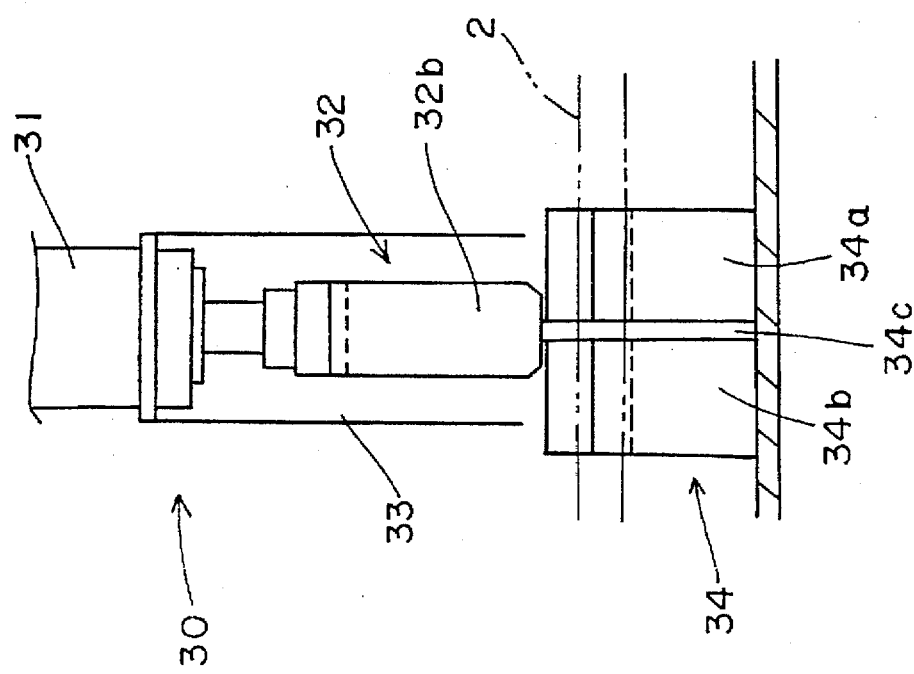

The cutting unit 30 is composed of a guide 34 for guiding the molding 2 pushed out from the inserting unit 20, and a cutter 32 for cutting the molding 2 guided by the guide 34, as shown in FIGS. 9A and 9B. The cutter 32 has a cutting wire 32a which is heated by an unillustrated heater to cut the molding 2. The guide 34 includes guide members 34a and 34b which are disposed adjacent to each other to form a clearance 34c therebetween through which the cutting wire 32a of the cutter 32 passes. A guide passage 34d is formed in each of the guide members 34a and 34b to allow the molding 2 to pass through the guide passage 34d. The cutter 32 includes a cylinder 31 and a cutting section 32b. The cylinder 31 is supported by a support column 33 which is vertically disposed on the base plate 11. The cutting section 32b is attached to the piston rod of the cylinder 31 for vertical movement therewith. In the cutting unit 30 having the above-described structure, the cutting section 32b is first lowered in response to a command from the controller 7 to cut the molding 2. In the next cutting operation, the cutting section 32b is raised to cut the molding 2. The cutting section 30 is not limited to the above-described wire cutter, and may be other types of cutting mechanisms such as one in which the molding 2 is cut by a pair of cutting blades, like scissors.

Figure 10:
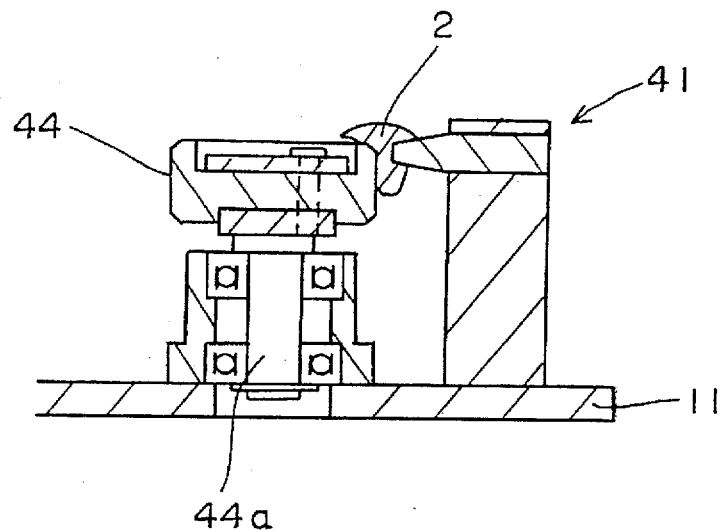
Figure 11:
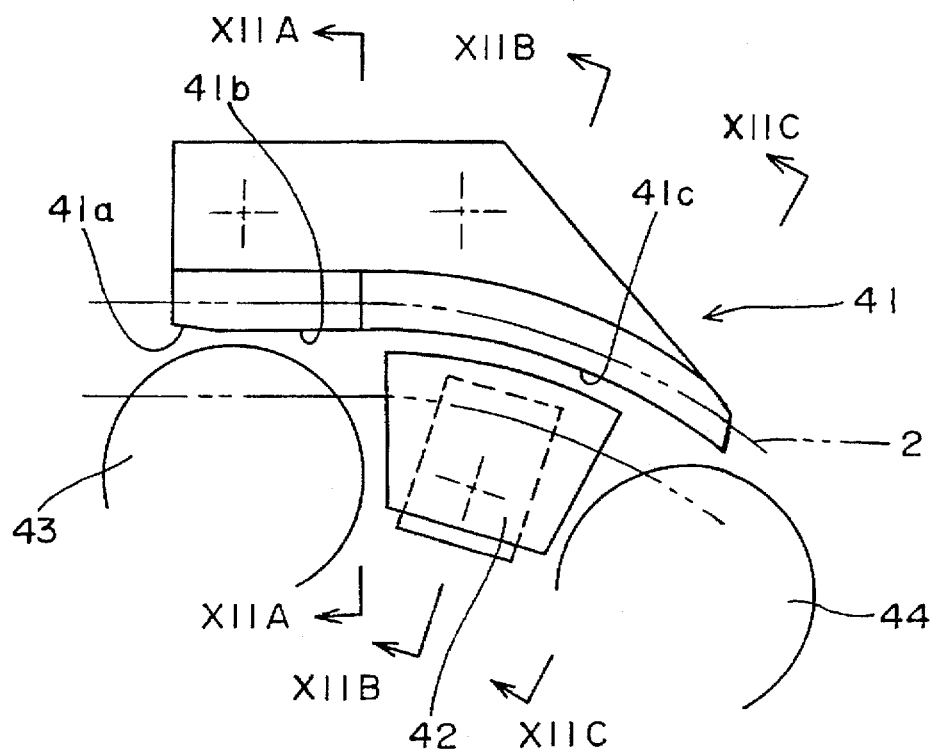
FIG. 11 is a plan view showing the first and second rails of the attaching head shown in FIG. 7.

The first guide section 40 is formed by a first roller 43, a second roller 44, a first rail 41 and a second rail 42, as shown in FIG. 7. The first and second rails 41 and 42 are disposed facing each other. These rails 41 and 42 serve to expand the groove of the molding 2 to a width greater than the thickness of the glazing 1, and to change the direction of the molding 2 to run along the slanted side 11a of the base plate 11. The first roller 43 for maintaining the engagement of the molding 2 with the first rail 41, and the second roller 44 for changing the direction of the molding 2 have the same structure. Therefore, only the structure of the second roller 44 will be described. As shown in FIG. 10, the roller 44 is fixedly attached to the shaft 44a which is supported on the base plate 11 for rotation about a vertical axis. The second roller 44 cooperates with the opposite first rail 41 to support the molding 2 therebetween.

Figure 12A:
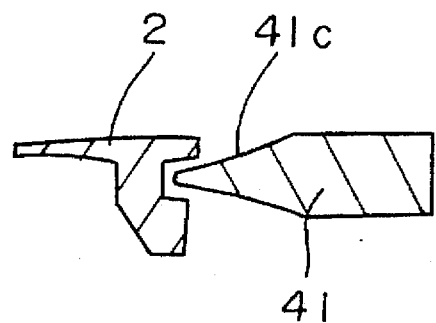
FIGS. 12A, 12B and 12C are sectional views of the first and second rails taken along lines XIIA—XIIA, XIIB—XIIB, and XIIC—XIIC, respectively, in FIG. 11.
Figure 12B:
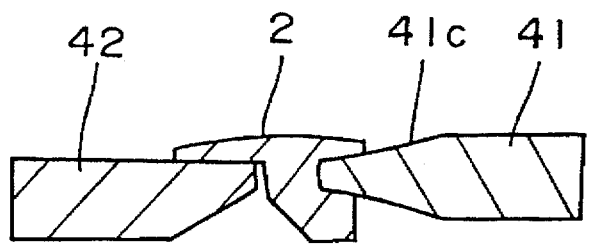
Figure 12C:
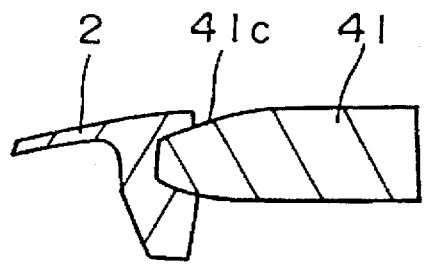

As shown in FIG. 11 and FIGS. 12A, 12B and 12C, the first rail 41 has a slanted portion 41a and a straight portion 41b which cooperate with a first roller 43 facing the slanted portion 41a to facilitate the insertion of the molding 2. The first rail 41 also-has an arcuate portion 41c which cooperates with a second rail 42 facing thereto to expand the groove 2a of the molding 2 and also cooperates with a second roller 44 to change the direction of running of the molding 2. The arcuate portion 41c has an inner edge the thickness (or cross section) of which is smaller than the width (or cross section) of the groove 2a, as shown in FIG. 12A. The thickness (or cross section) increases toward the middle of the arcuate portion 41c in the feeding direction of the molding 2, as shown in FIG. 12B, and finally becomes greater than the width (or cross section) of the groove 2a, as shown in FIG. 12C.

The molding 2 maintains its expanded state until the molding 2 is pressed against the glazing 1 in the pressing section 50. The maintenance of such a state is possible because the molding 2 has not hardened, and has a high plasticity.

Figure 13:
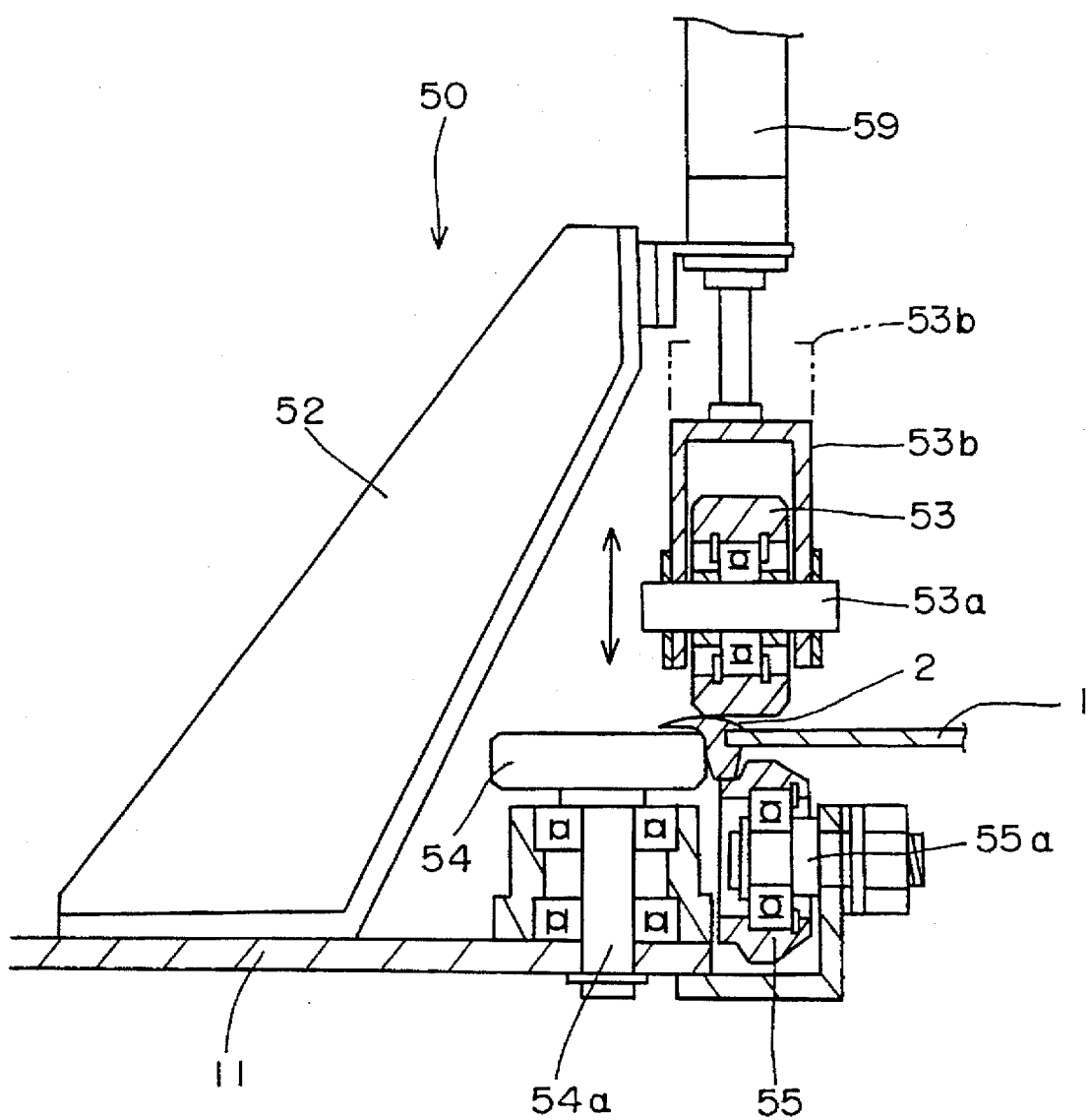
FIG. 13 is a sectional view of the pressing section of, the attaching head shown in FIG. 7.

As shown in FIG. 13, the pressing section 50 is composed of a horizontal support roller 54, a vertical support roller 55, and a pressing roller 53. The horizontal support roller 54 is fixed to a rotary shaft 54a which is vertically disposed on the base plate 11 for rotation about a vertical axis. The vertical support roller 55 is rotatably supported by a rotary shaft 55a parallel to the base plate 11. The pressing roller 53 is provided on a support column 52 fixed to the base plate 11, and is vertically moved by a cylinder 59. The horizontal support roller 54 and the vertical support roller 55 serve to support the molding 2 from the lower side thereof in a state in which the glazing 1 has been inserted into the groove 2a of the molding 2. The pressing roller 53 is supported for rotation about a shaft 53a which is horizontally supported on a support member 53b. The pressing roller 53 is moved downward by the cylinder 59 to press the molding 2 from the upper side thereof with predetermined pressure generated by the cylinder 59, so that the glazing 1 and the groove 2a are bonded with each other. Primer is applied to an adhesion surface of the glazing 1. When the molding 2 is pressed in the pressing section 50, the molding 2 is deformed from the expended shape to a shape (close to the original shape) conforming to the shape of the edge of the glazing 1.

Figure 14:
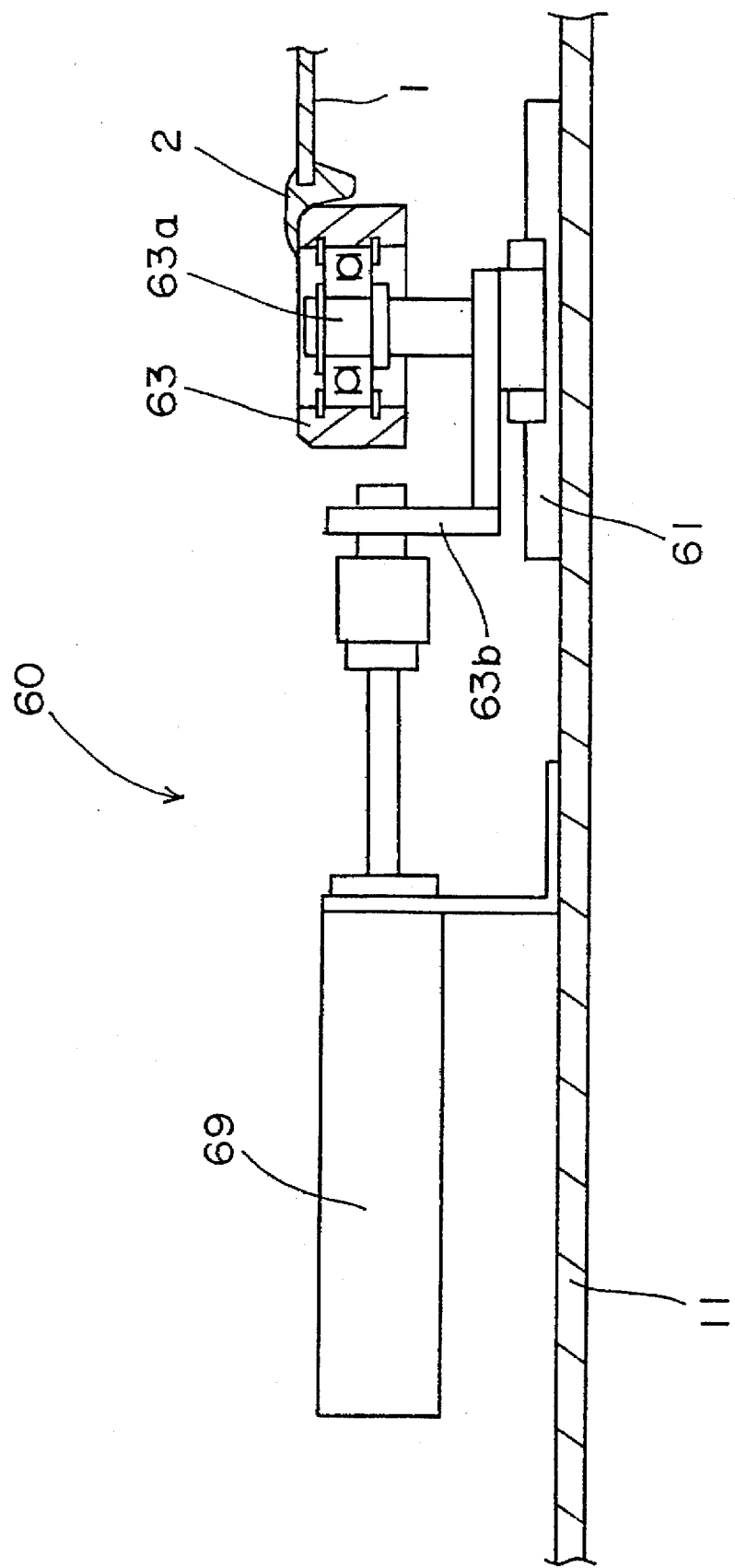
FIG. 14 is a partially sectioned view of the second guide section of the attaching head shown in FIG. 7.

As shown in FIG. 14, the second guide 60 is composed of a guide roller 63 which is horizontally movable on the base plate 11, and a cylinder 69 for moving the guide roller 63. In detail, the movable guide roller 63 is rotatably supported by a shaft 63a upwardly projecting from a support member 63b. The support member 63b is guided by a horizontal rail 61 on the base plate 11. When the support member 63b is advanced by a cylinder 69, the molding 2 is horizontally pressed by the guide roller 63 with predetermined pressure. This prevents the molding 2 from separating from the glazing 1 when the molding 2 attached to the glazing 1 moves together with the glazing 1.

Figure 16A:
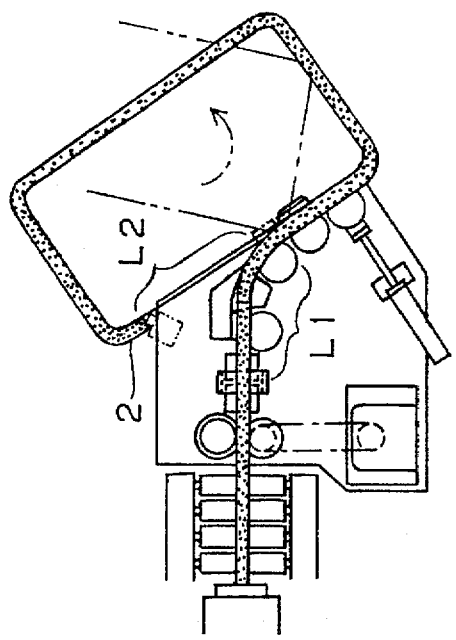
FIGS. 16A through 16D are plan views showing the operation of the molding attaching apparatus according the first embodiment.
Figure 16B:
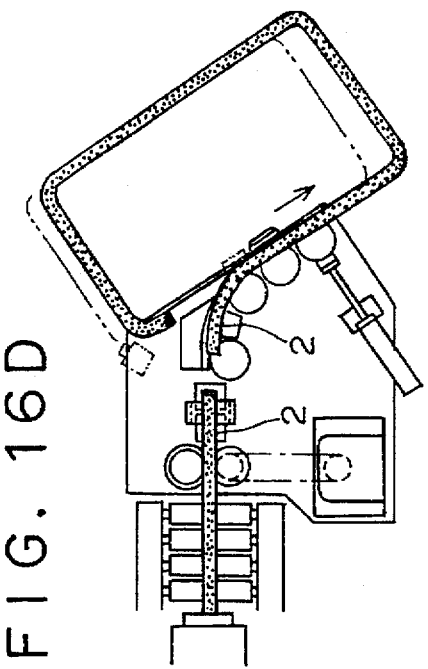
Figure 16C:
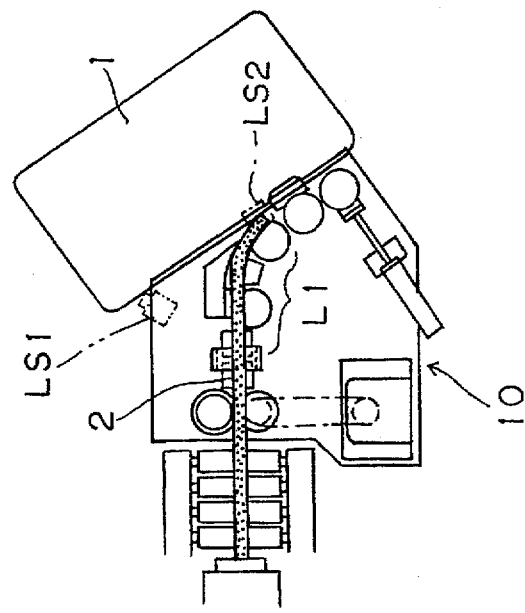
Figure 16D:
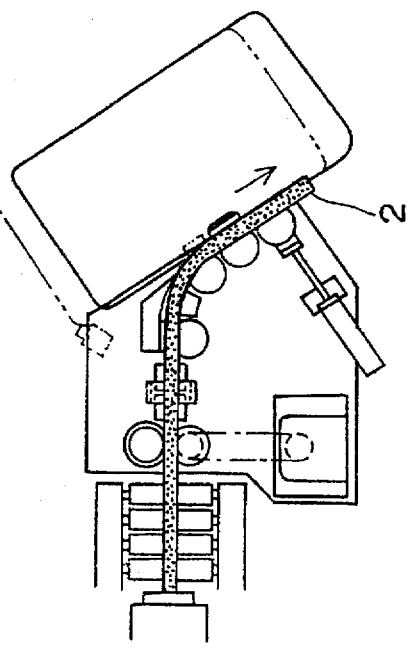
Figure 17:
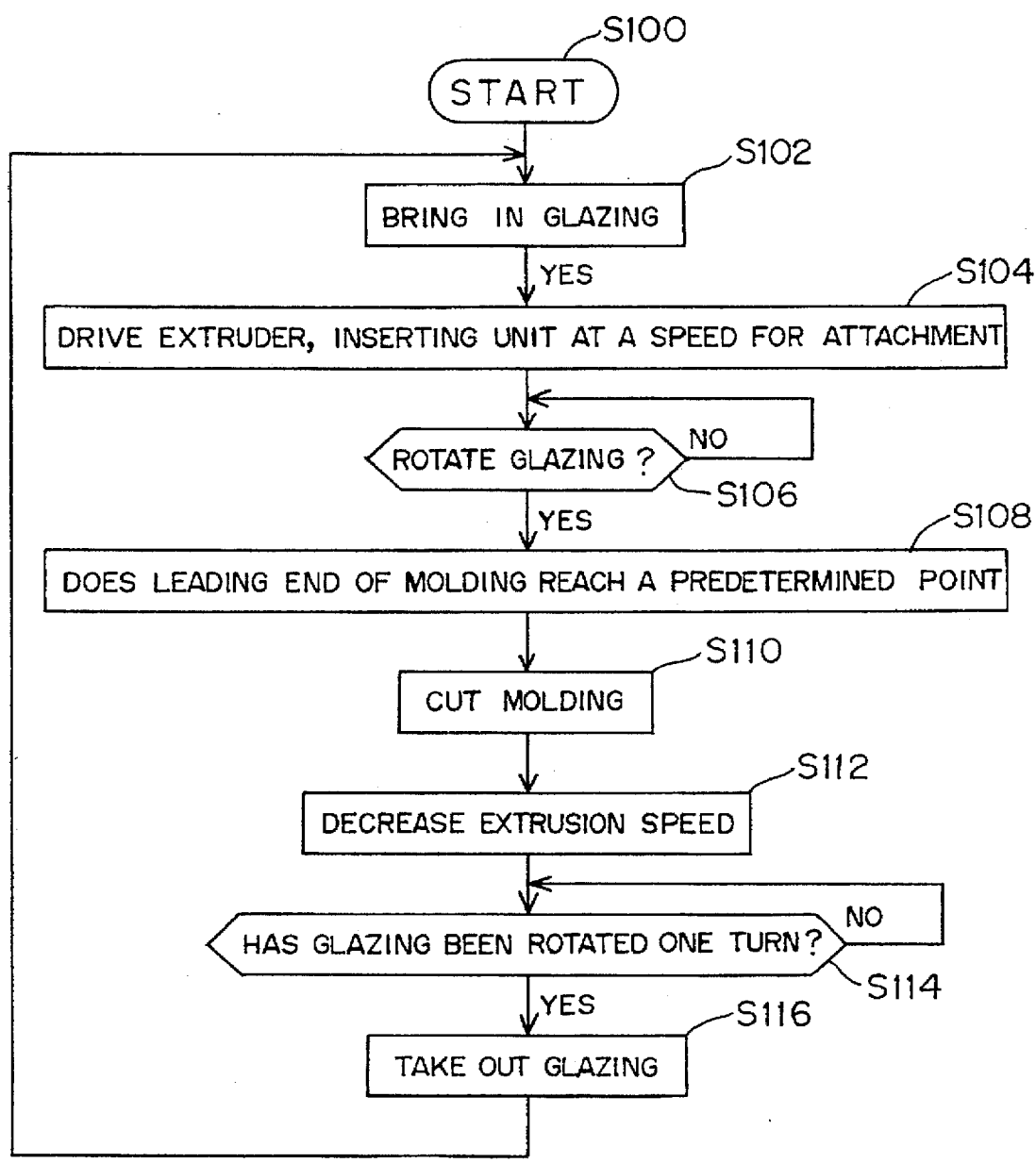
FIG. 17 is a flowchart showing the operation of the molding attaching apparatus according to the second embodiment.

The operation of the molding attaching apparatus according to the present embodiment will now be described with reference to the plan views of FIGS. 16A, 16B and 16C, and the flowchart shown in FIG. 17. In FIGS. 16A, 16B and 6C, the size of the glazing 1 is considerably reduced compared to the attaching head 10 to facilitate the understanding of the following description.

Before starting an automatic operation for the attachment of the molding 2, a worker must perform an initial setup of the attaching head 10. In detail, the worker inserts the leading end of the molding 2, which has been extruded from the extruder 5, into the inserting unit 20 and then between the guide members 34a and 34b of the cutting unit 30. It is preferred that the extrusion speed of the extruder 5 at this time be slower than the speed for automatic attachment of the molding 2. After the initial setup, the worker temporarily stops the extruder 5. In such an initial state, the pressing roller 53 of the pressing section 50 and the guide roller 63 of the second guide section 60 are located at their retracted positions.

The worker thereafter presses an unillustrated start switch to supply a start signal to the controller 7, so that an automatic operation for the attachment of the molding 2 is started.

In step 102, the operation of the robot 4 is started. The robot 4 holds the glazing 1 on an unillustrated workpiece table using the sucker 4a. The robot 4 inserts the edge of the glazing 1 into the pressing section 50, and then goes to a waiting state. It is to be noted that primer is previously applied to the periphery of the glazing 1 where the molding 2 is to be attached.

In step 104, the extruder 5 and the inserting unit 20 are operated to start the extrusion and insertion of the molding 2 at speeds corresponding to a preset extrusion speed suitable for attaching the molding 2. This extrusion speed is determined based on the peripheral speed of the glazing 1 which is rotated by the robot 4. The extrusion speed of the extruder 5 is set substantially equal to the insertion speed of the inserting unit 20. The rotational speed of the glazing 1 is set equal to he insertion speed of the inserting unit 20, or slightly higher than the insertion speed of the inserting unit 20 to apply a slight tension to the molding 2. At this time, the pressing roller 53 of the pressing section 50 and the guide roller 63 of the second guide section 60 are located at their advanced positions.

With the above-described operation, the leading end of the molding 2 passes through the first guide section 40. When the leading end of the molding 2 approaches the glazing 1, the robot 4 is operated to rotate the glazing 1 at a preset peripheral speed (the state shown in FIG. 16A, step 106). A non-contact limit switch LS2 (illustrated by a two-dot chain line in FIG. 7) disposed in the vicinity of the pressing section 50 detects whether the leading end of the molding 2 approaches the glazing 1. This detection may be performed by clocking the time until the leading end of the molding 2 coming out from the cutting unit 30 reaches the point where the molding 2 contacts the glazing 1 in the pressing section 50. The time is determined by the extrusion speed for attachment and the distance between the cutting unit 30 to the point where the molding 2 contacts the glazing 1. The molding 2 is then attached to the periphery of the glazing 1, which is rotated by the movement of the robot 4.

In detail, the molding 2 extruded from the extruder 5 is first inserted into the attaching head 10 by the inserting unit 20. The molding 2 is then passed through the cutting unit 30 to reach the first guide section 40 where the groove 2a of the molding 2 is expanded. Subsequently, the glazing 1 is then fitted into the groove 2a of the molding 2 in the pressing section 50. The molding 2 is then pressed by the pressing roller 53. The molding 2 is guided by the second guide section 60 after being attached to the glazing (the state shown in FIG. 16B).

The attachment operation of the molding 2 gradually proceeds. When it is judged that the leading end of the molding 2 reaches a predetermined position, i.e., it is judged that the attachment of the molding 2 is completed up to a predetermined position (step 108), the cutting unit 30 is driven to cut the molding 2 (step 110). When the leading end of the molding 2 reaches the predetermined position, the length L2 of the portion of the periphery of the glazing 1 where the molding 2 has not been attached becomes equal to the distance L1 from the cutting unit 30 to the point where the molding 2 contacts the glazing 1 in the pressing section 50, as shown in FIG. 16C. The arrival of the leading end of the molding 2 at the predetermined position can be detected by a non-contact limit switch LS1 illustrated by a two-dot chain line in FIG. 7. Alternatively, the arrival of the glazing 1 at a predetermined position or angle is indirectly detected by detecting that the hand of the robot 4 reaches a predetermined teaching point.

Even after the molding 2 is cut, the molding 2 is fed as the glazing 1 rotates. With this operation, the attaching operation has been performed up to the tailing end of the molding 2.

Meanwhile, the operational speeds of the extruder 5 and the inserting unit 20 are decreased to speeds slower than the extrusion speed for attachment (step 112). This reduction of the speeds prevents the molding 2 from projecting from the pressing section 50 during a period from the time when the robot 4 takes out or removes the glazing 1 after the completion of the attachment to the time when the robot 4 completes the loading of the glazing 1. This prevents the molding 2 from wastefully being used.

In step 114, it is judged whether glazing 1 has been rotated one turn. This judgment can be made by detecting whether the hand of the robot 4 rotates by a predetermined angle which is preset by a teaching operation. When it is judged that the glazing 1 has been rotated one turn, the operation moves to step 116 in which the robot 4 removes the glazing 1. With this operation the attachment of the molding 2 for a single glazing 1 is completed. When the attaching operation is continued, the operation moves back to the step 102 to bring in a new glazing 1. Up to this time, the leading end of the molding 2 has moved forward from the cutting unit 30 to a point close to the pressing section 50 due to the extrusion at a low speed. Accordingly, for the second and later glazings 1, the attachment of the molding 2 can be started in step 106, immediately after the speeds of the extruder 5 and the inserting unit 20 are increased to the speeds for attachment in step 104.

With the above-described operation, the molding 2 can automatically be attached to the periphery of the glazing 1. In the molding attaching apparatus according to the present embodiment, the molding 2 is attached to the glazing 1 in a state in which the molding 2 has not hardened completely and is soft, although it has been formed in a predetermined shape. Accordingly, the molding can easily conform to the shape of the glazing 1 even at the four arcuate corners. If the completely hardened molding is attached to the glazing by the above-described attaching head 10, waves are formed at the four corners, thereby deteriorating the appearance.

Figure 18:
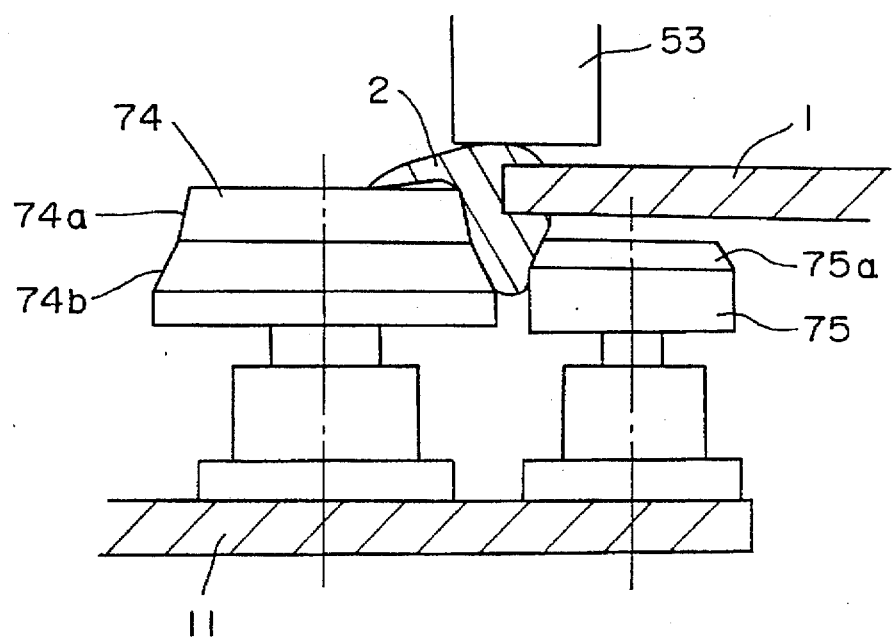
FIG. 18 is a sectional view showing a modification of the pressing section.

Although the pressing section 50 having the horizontal support roller 54, the vertical support roller 55, and the pressing roller 53 is used in the above-described embodiment, the pressing section 50 may be formed by a first horizontal support roller 74, a second horizontal support roller 75 and a pressing roller 53, as shown in FIG. 18. In this case, the first and second horizontal rollers 74 and 75 which contact the molding 2 have tapered surfaces 74a, 74b and 75a. In this structure, a force for pushing up the molding 2 from the lower side is generated when the molding 2 is pressed against the glazing 1 by the pressing roller 53. Accordingly, the attachment of the molding 2 can be performed well. The number of rollers used in the pressing section 50 is not limited to three, and may be one or two depending on the shape of the molding 2. Similarly, the vertical roller 23 of the inserting unit 20 is not necessarily needed. Also, the structure of the attaching head may be modified to feed the molding 2 using a pair of inserting units.

In the above-described embodiment, the operational speeds of the extruder 5 and the inserting unit 20 are decreased to speeds lower than the extrusion speed for attachment after the molding 2 is cut. However, the structure may be modified to stop the extrusion of the molding 2 after the molding 2 is cut and continue this state until the next glazing is brought in.

Figure 1:
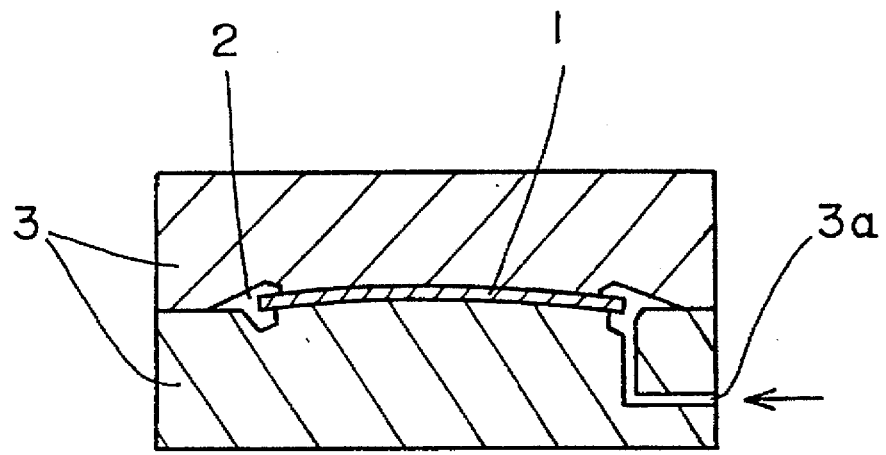
FIG. 1 is a sectional view showing a conventional apparatus for attaching a molding.
Figure 3:
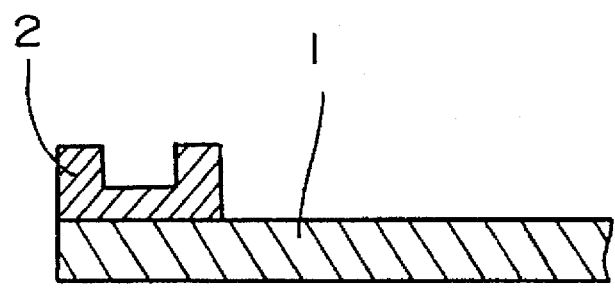
FIG. 3 is a sectional view showing the shape of a conventional molding.
Figure 2:
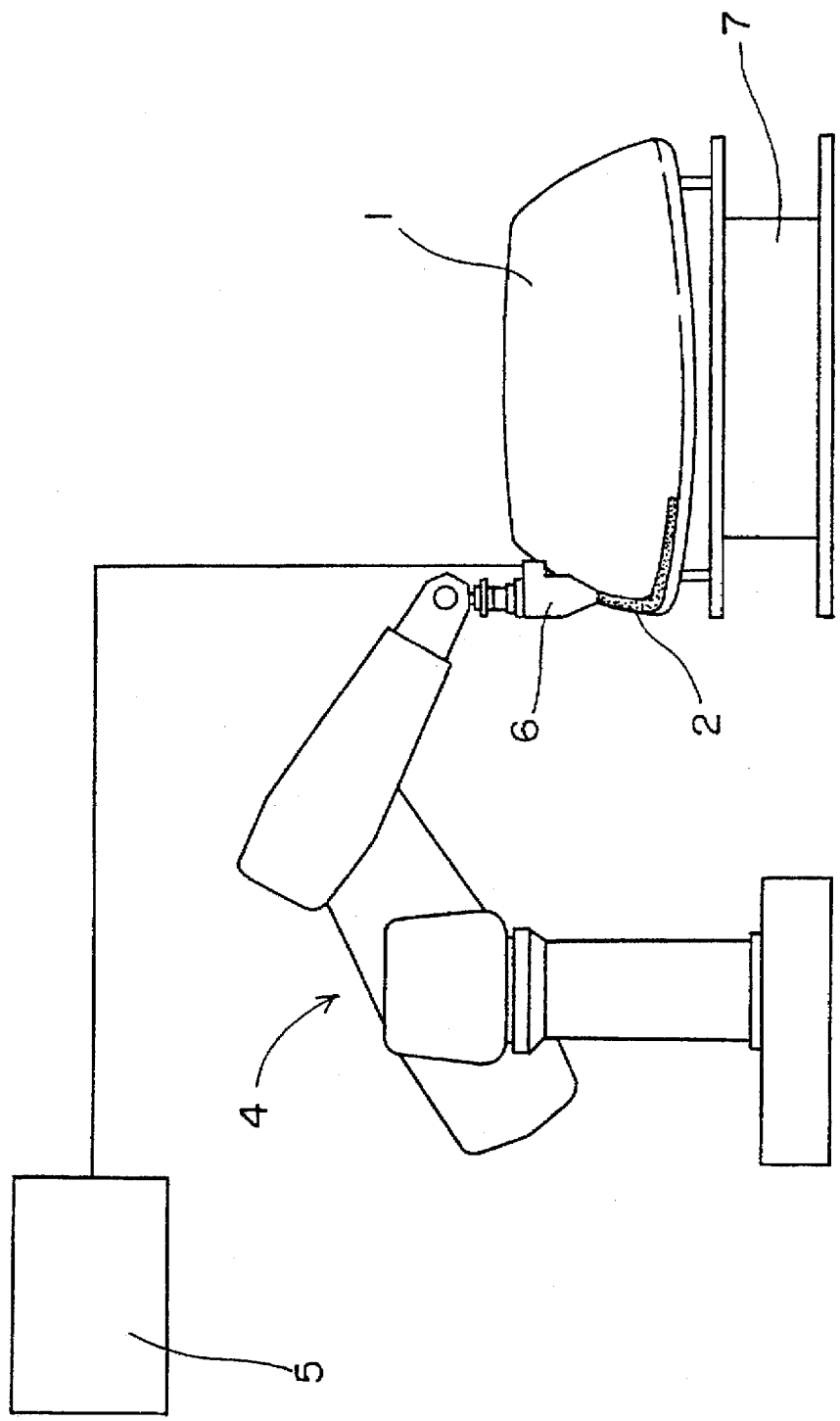
FIG. 2 is a schematic view showing another conventional apparatus for attaching a molding.
Figure 5:
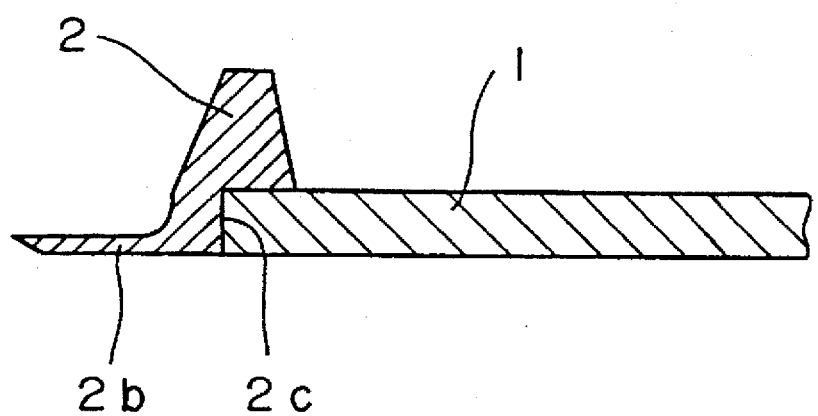
FIG. 5 is a sectional view showing the shape of a modified molding used in the present invention.

In the above-described embodiment, the molding 2 has a groove 2a to cover the edge of the glazing. However, the shape of the molding 2 may be modified to have an attaching portion 2c which exposes one side of the glazing 1 to the outside, as shown in FIG. 5. In addition, the conventional molding as shown in FIG. 3 may be used.

In the molding attaching apparatus according to the present embodiment, a molding is attached to a glazing by relatively moving the glazing. Therefore, a large apparatus which entirely covers the glazing is not needed. Accordingly, the overall size of the apparatus can be made smaller.

Moreover, the operational speeds of the extruder and the inserting unit are decreased from the time when the molding is cut to complete the attaching operation to the time when the next article is loaded by the robot. Therefore, the molding is not uselessly formed even if the extrusion of the molding is continued. In addition, the attachment of a molding can be restarted immediately after the next workpiece is brought in.

Second Embodiment

A molding attaching apparatus according to a second embodiment of the present invention will now be described with reference to FIG. 19 through FIG. 25B. The molding attaching apparatus of the present embodiment has the same structure as that in the first embodiment except the structure of the attaching head.

Figure 19:
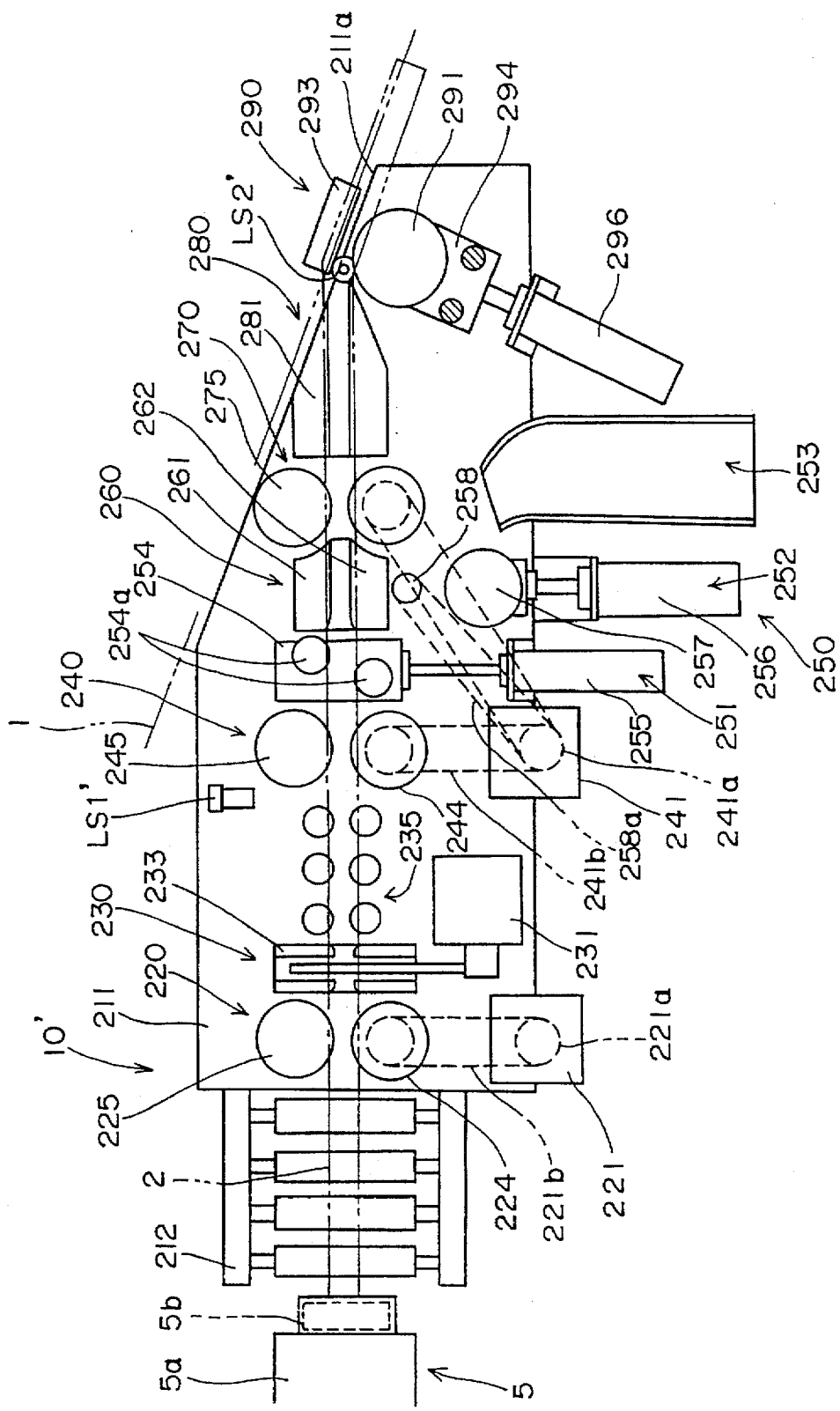
FIG. 19 is a plan view showing the attaching head of a molding attaching apparatus according to a second embodiment of the present invention.

The structure of the attaching head 10' will be described in detail. As shown in FIG. 19, the attaching head 10' is fixed to a floor surface and includes a first inserting unit 220, a cutting unit 230, a first guide section 235, a second inserting unit 240, a molding ejecting unit 250, a second guide section 260, a third inserting unit 270, a third guide section 280, a pressing section 290, and a glazing support section 310 (not illustrated in FIG. 19). These units and sections are disposed on a base plate 211 having a slanted side 211a for facilitating the guide of the glazing 1. Numeral 212 denotes a roller guide for guiding the molding 2 which is extruded from the extruder 5 toward the attaching head 10'. The inserting units 220, 240 and 270 serve to compulsorily feed the molding 2 in the attaching head 10'. The cutting unit 230 cuts the molding 2 in a predetermined length. The first, second and third guide sections 235, 260 and 280 serve to lead the molding 2 to the pressing section 290. Among these guide sections, the third guide section 280 serves to expand the groove 2a of the molding 2 (see FIG. 4) which receives the edge of the glazing 1. The second and third guide sections 260 and 280 serve to heat the attaching side of the molding 2 where the groove 2a is formed, and to cool the opposite surface of the molding 2, i.e., the non-attaching side of the molding 2. The molding ejecting unit 250 serve to eject unusable portions of the molding 2, thereby preventing such portions from being led to the pressing section 290. The pressing section 290 serves to attach the molding 2 to the glazing 1 such that the edge of the glazing 1 enters the groove 2a, and press the molding 2 for adhesion to the glazing 1. The glazing support section 310 supports the glazing 1 from the upper and lower sides of the glazing 1 for accurate positioning.

The structures of the above-described units and sections will now be described in more detail.

Since the first, second and third inserting units 220, 240 and 270 basically have the same structure, only the structure of the first inserting unit 220 will be described. In these units, the corresponding components are represented by reference numerals having the same lowermost-digit figure. However, the second and third inserting units 240 and 270 are equipped with a motor 41 which operates these units in a synchronized manner.

Figure 20:
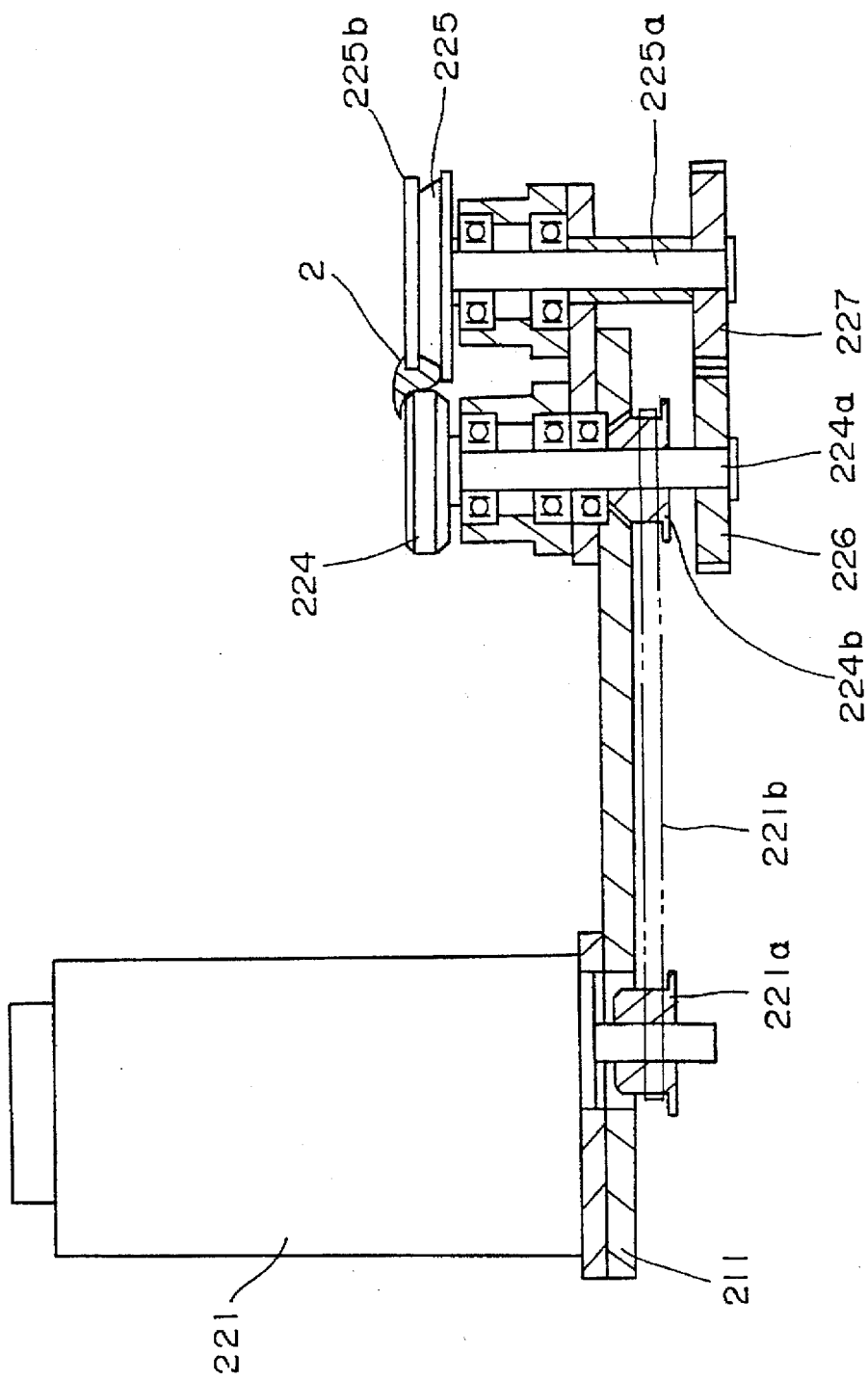
FIG. 20 is a partially sectioned view showing the inserting unit of the attaching head shown in FIG. 19.
Figure 21:
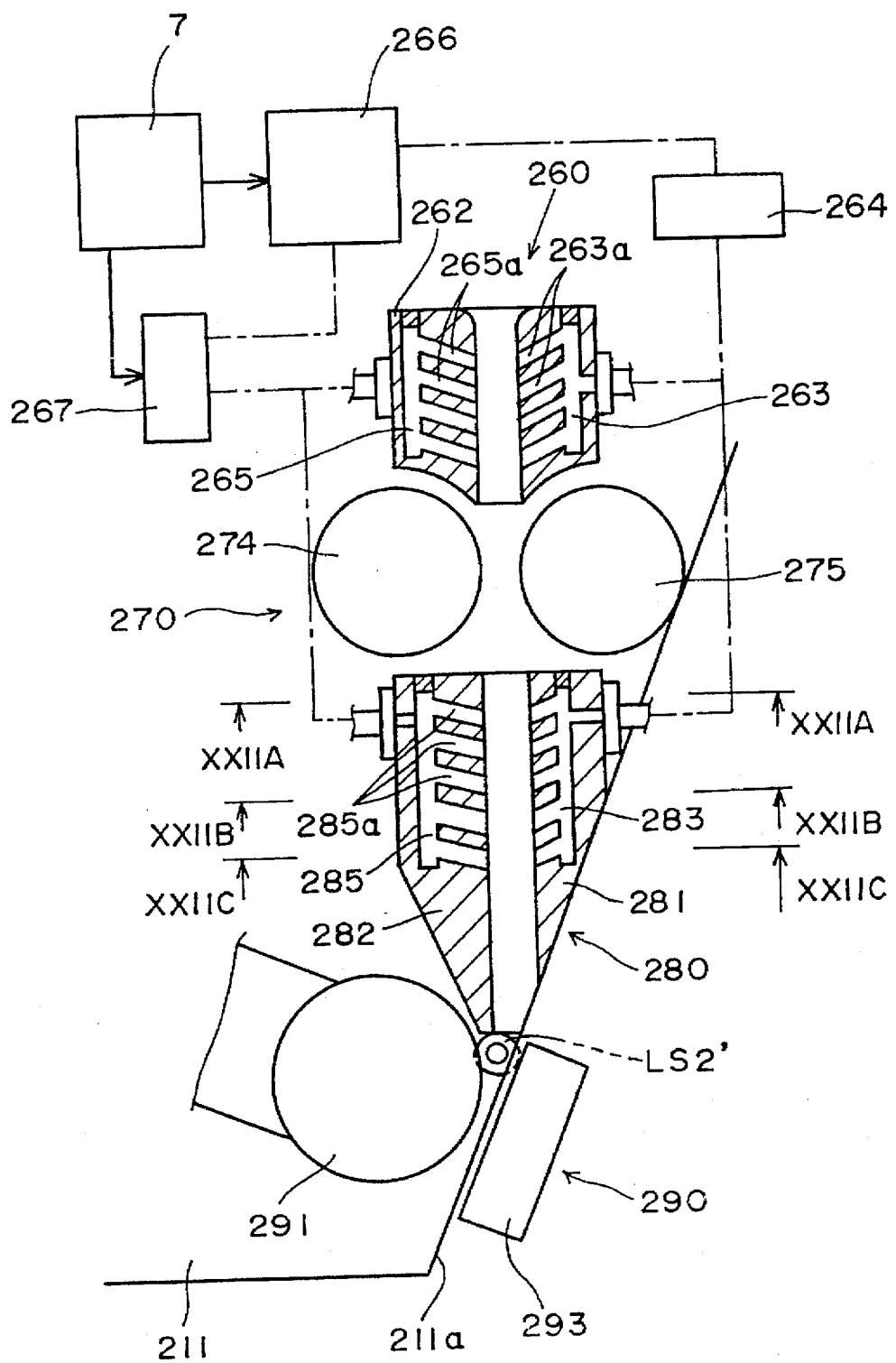
FIG. 21 is a view showing the second and third guide sections of the attaching head shown in FIG. 19.

As shown in FIG. 20, the first inserting unit 220 includes a first horizontal roller 224, and a second horizontal roller 225. The first horizontal roller 224 is supported by a rotary shaft 224a having a pulley 224b. The pulley 224b is drivingly connected to a pulley 221a of a motor 221 via a belt 221b. The motor 221 is of a variable speed type and is controlled to rotate at a speed corresponding to the extrusion speed of the extruder 5. The second horizontal roller 225 is fixed to a rotary shaft 225a. A gear 226 fixed to the lower end of the rotary shaft 224a of the first horizontal roller 224 is meshed with a gear 227 fixed to the lower end of the rotary shaft 225a. Accordingly, the second horizontal roller 225 rotates synchronously with the first horizontal roller 224 in a direction opposite to the rotational direction of the first horizontal roller 224. The second horizontal roller 225 is provided with a groove engagement portion 225b which enters the groove 2a of the molding 2 with a predetermined gap so as to maintain the shape of the groove 2a of the molding 2 which has not completely hardened.

The cutting unit 230 is composed of a block 233 for guiding the molding 2 coming out from the first inserting unit 220, a cutter blade 232 for cutting the molding 2 guided by the block 233, and a cylinder 231 for moving the cutter blade 232. The cutter blade 232 is moved by the cylinder 231 via an unillustrated coil spring built in the cylinder 231 in a vertical direction (the direction perpendicular to the surface of the sheet in FIG. 19). The cutting unit 230 having the above-described structure responds to a command from the controller 7 and operates the cylinder 231 to vertically move the cutter blade 232 in cooperation with the coil spring built in the cylinder 231. With this operation, the molding 2 guided by the bracket 233 is cut. The cutting section 230 is not limited to the above-described type in which a cutter blade is vertically moved, and may be a wire cutter, or a cutting mechanism in which the molding 2 is cut by a pair of cutting blades, like scissors.

The first guide section 235 is formed by three pairs or six rollers 236. Each of the rollers 236 is supported for rotation about a vertical axis. Each pair of the rollers 236 serves to support the molding 2 running on the base plate 211. These rollers 236 rotate as the molding 2 moves. The molding 2 is led to the second inserting unit 240 after passing through the first guide section 235. Since the structure of the second inserting unit 240 is identical to that of the first inserting unit 220, the description therefor will be omitted. A first proximity switch LS1' is disposed between the first guide section 235 and the second inserting unit 240.

The molding ejecting unit 250 is composed of a molding drawing section 251, a molding holding section 252 and a chute 253. The molding drawing section 251 is composed of a support section 254 having a pair of rollers 254a for supporting the molding 2, and a cylinder 255 for moving the support section 254. The support section 254 is moved toward the chute 253 by the cylinder 255 to change the direction of the molding 2. The molding holding section 252 is arranged at a side of the second guide section 260, and includes rollers 258 and 257. The roller 258 is supported by a vertical shaft and is rotated by the motor 241 via a belt 258a. The roller 257 is rotatably supported by a vertical shaft and is moved by a cylinder 256 to approach and separate from the roller 258. When the roller 257 is separated from the roller 258, the leading end of the molding 2 coming out from the molding drawing section 251 is led between the rollers 257 and 258. The molding 2 is then held by the rollers 257 and 258 by approaching the roller 257 to the roller 258. The molding 2 thus held is led to the chute 253 while being guided by the rollers 257 and 258. The chute 253 is formed by a slanted plate and allows the molding 2 to slide down to an unillustrated ejecting section.

In the molding ejecting unit 250 having the above structure, the direction of running of the molding 2 is changed by the molding drawing section 251 after the leading end of the molding 2 has passed through the second inserting unit 240 but before reaching the second guide section 260. The molding 2 is then led to the chute 253 while being guided by the molding holding section 252.

In the second guide section 260, the molding 2 fed from the second inserting unit 240 via the molding withdrawing section 251 of the molding ejecting unit 250 is supported from both sides thereof, and is led to the third inserting unit 270. The second guide section 260 includes first and second rails 261 and 262 facing each other for heating the molding 2 from the side having the groove 2a (the attaching side) and for cooling the molding 2 from the opposite side having the lip 2b (the non-attaching side). In detail, the first rail 261 is formed with a hot air supply path 263 for heating the attaching side of the molding 2 and thereby maintaining the plasticity of the molding 2 high. The hot air supply passage 263 is connected to an air supply unit 266 via an air heating unit 264. The air supply unit 266 and the air heating unit 264 are controlled by a controller 7. The air from the air supply unit 266 is heated by the air heating unit 264, and is then jetted from hot air supply ports 263a communicating with the hot air supply path 263. Similarly, the second rail 262 is formed with a cool air supply path 265 for cooling the non-attaching side of the molding 2 and thereby lowering the plasticity of the molding 2. The cool air supply passage 265 is connected to the air supply unit 266 via an air cooling unit 267 which is controlled by a controller 7. The air from the unit supply unit 266 is cooled by the air cooling unit 267, and is then jetted from cool air supply ports 265a communicating with the cool air supply path 265. The hot air supply ports 263a and the cool air supply ports 265a are formed with inclination toward the moving direction of the molding 2 so that air is jetted toward the moving direction of the molding 2.

The molding 2 thereafter passes through the third inserting unit 270 and the third guide section 280 successively.

Since the structure of the third inserting unit 270 is identical to that of the first inserting unit 220, the description therefor will be omitted. The third guide section 280 includes first and second rails 281 and 282, similarly to the second guide section 260. The first and second rails 281 and 282 heats the molding 2 from the side having the groove 2a (the attaching side) and cools the molding 2 from the opposite side having the lip 2b (the non-attaching side). Also, the third guide section 280 has a structure to expand the groove 2a of the molding 2 to a width greater than the thickness of the glazing 1, thereby facilitating the insertion of the glazing 1 to the groove 2a. In detail, the first rail 281 is formed with a hot air supply path 283 which is connected to the above-described air heating unit 264, and the second rail 282 is formed with a cool air supply path 285 which is connected to the above-described air cooling unit 267. Accordingly, heated air is jetted from hot air supply ports 283a communicating with the hot air supply path 283, while cooled air is jetted from cool air supply ports 285a communicating with the cool air supply path 285. Like the second guide section 260, the hot air supply ports 283a and the cool air supply ports 285a are formed with inclination toward the moving direction of the molding 2.

Figure 22A:
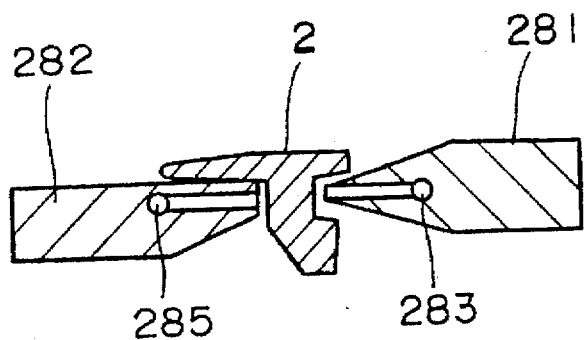
FIGS. 22A, 22B and 22C are sectional views of the first and second rails of the third guide section taken along lines XXIIA—XXIIA, XXIIB—XXIIB, and XXIIC—XXIIC, respectively, in FIG. 21.
Figure 22B:
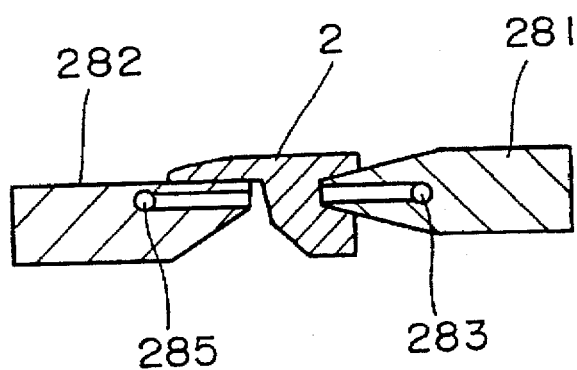
Figure 22C:
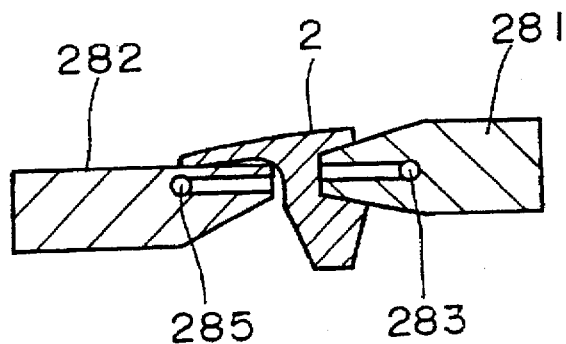

Moreover, as shown in FIGS. 22A, 22B and 22C, the first rail 281 has an inner edge the thickness (or cross section) of which is smaller than the width (or cross section) of the groove 2a, as shown in FIG. 22A. The thickness (or cross section) increases toward the middle of the first rail 281 in the feeding direction of the molding 2, as shown in FIG. 22B, and finally becomes greater than the width (or cross section) of the groove 2a, as shown in FIG. 22C.

The molding 2 maintains its expanded state until the molding 2 is pressed by the pressing section 290. The maintenance of such a state is possible because the molding 2 has not hardened, and has a high plasticity.

Figure 23A:
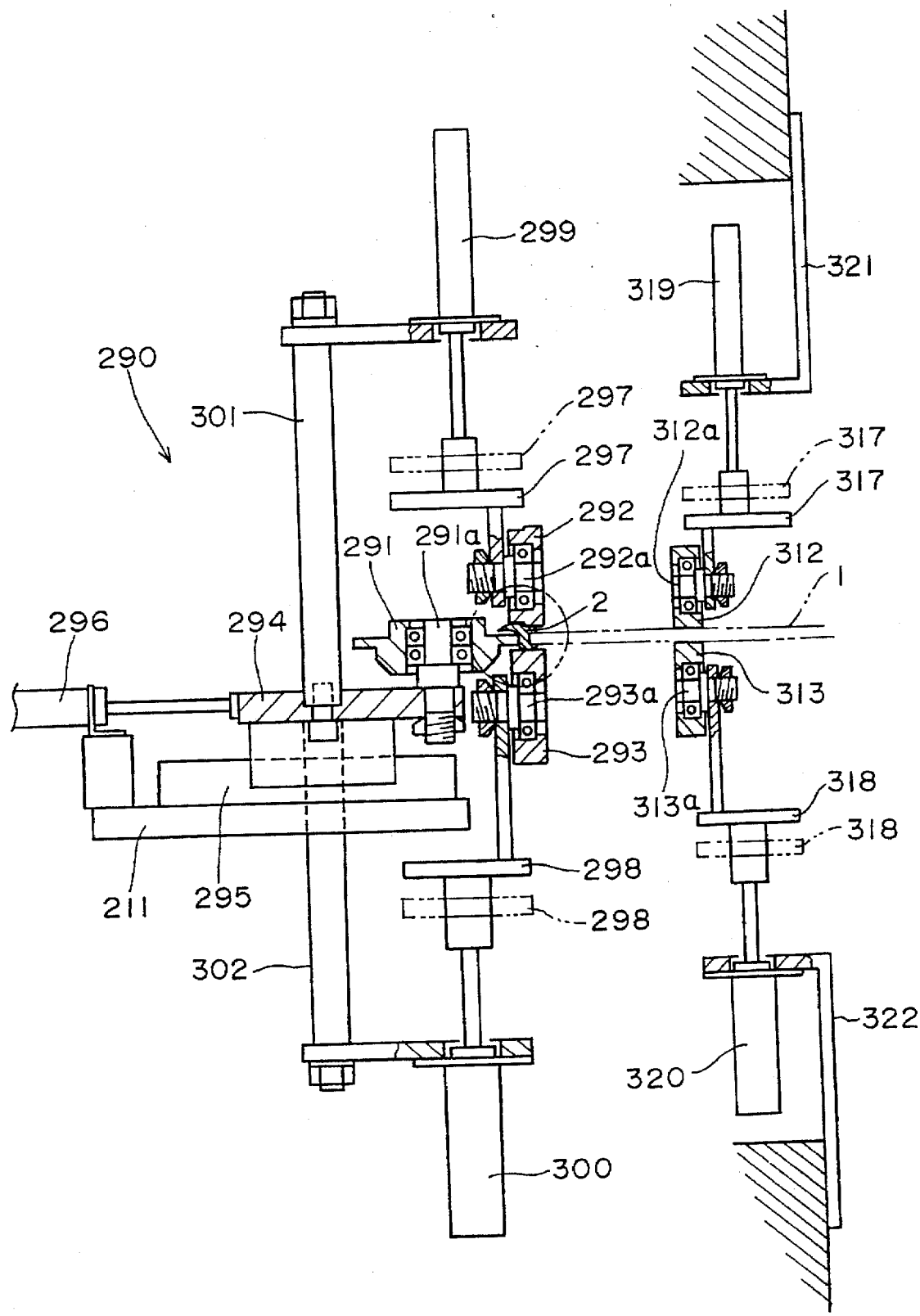
FIGS. 23A is a sectional view showing the pressing section and the glazing support section of the attaching head shown in FIG. 19.

As shown in FIG. 23A, the pressing section 290 is composed of a horizontal roller 291, an upper vertical roller 292, and a lower vertical roller 293. The horizontal roller 291 is rotatably supported by a shaft 291a perpendicular to the base plate 211. The upper vertical roller 292 is rotatably supported by a shaft 292a parallel to the base plate 211 such that the roller 292 is located on the upper side of the molding 2 which is fed into the pressing section 290. The lower vertical roller 293 is rotatably supported by a shaft 293a parallel to the base plate 211 such that the roller 293 is located on the lower side of the molding 2. The shaft 291a of the horizontal roller 291 is vertically disposed on a movable member 294 which is guided by the rail 295 on the base plate 211 and is connected to a cylinder 296. With this structure, the movable member 294 is moved along the rail 295 on the base plate 211. The direction of movement of the movable member 294 is a direction suitable for laterally pressing the molding 2 against the glazing 1 which is inserted into the pressing section 290 by the robot 4. The shaft 292a of the upper vertical roller 292 is fixed to an upper bracket 297, which is connected to the cylinder 299 fixed to an upper column 301. The upper column 301 is fixed to the above-described movable member 294. Similarly, the shaft 293a of the lower vertical roller 293 is fixed to a lower bracket 298, which is connected to the cylinder 300 fixed to a lower column 302. The lower column 302 is fixed to the movable member 294. When the movable member 294 is located at its. retracted position, the cylinders 299 and 300 are in their contracted states. In this state, the upper vertical roller 292 is located at its raised position, and the lower vertical roller 293 is located at its lowered position. In this initial state, the movable member 294 is advanced toward the glazing 1 to press the molding 2 toward the glazing 1 from its lateral side. When the cylinders 299 and 300 are operated, the upper vertical roller 292 is lowered and the lower vertical roller 293 is raised. With this operation, the molding 2 is pressed from its upper and lower sides so that the molding 2 is adhered to the glazing 1. Primer is applied to the adhesion surface of the glazing 1 in advance. When the molding 2 is pressed from the lateral side and the upper and lower sides thereof, the molding 2 is deformed from the expanded shape to a shape (close to the original shape) conforming to the shape of the edge of the glazing 1.

Figure 23B:
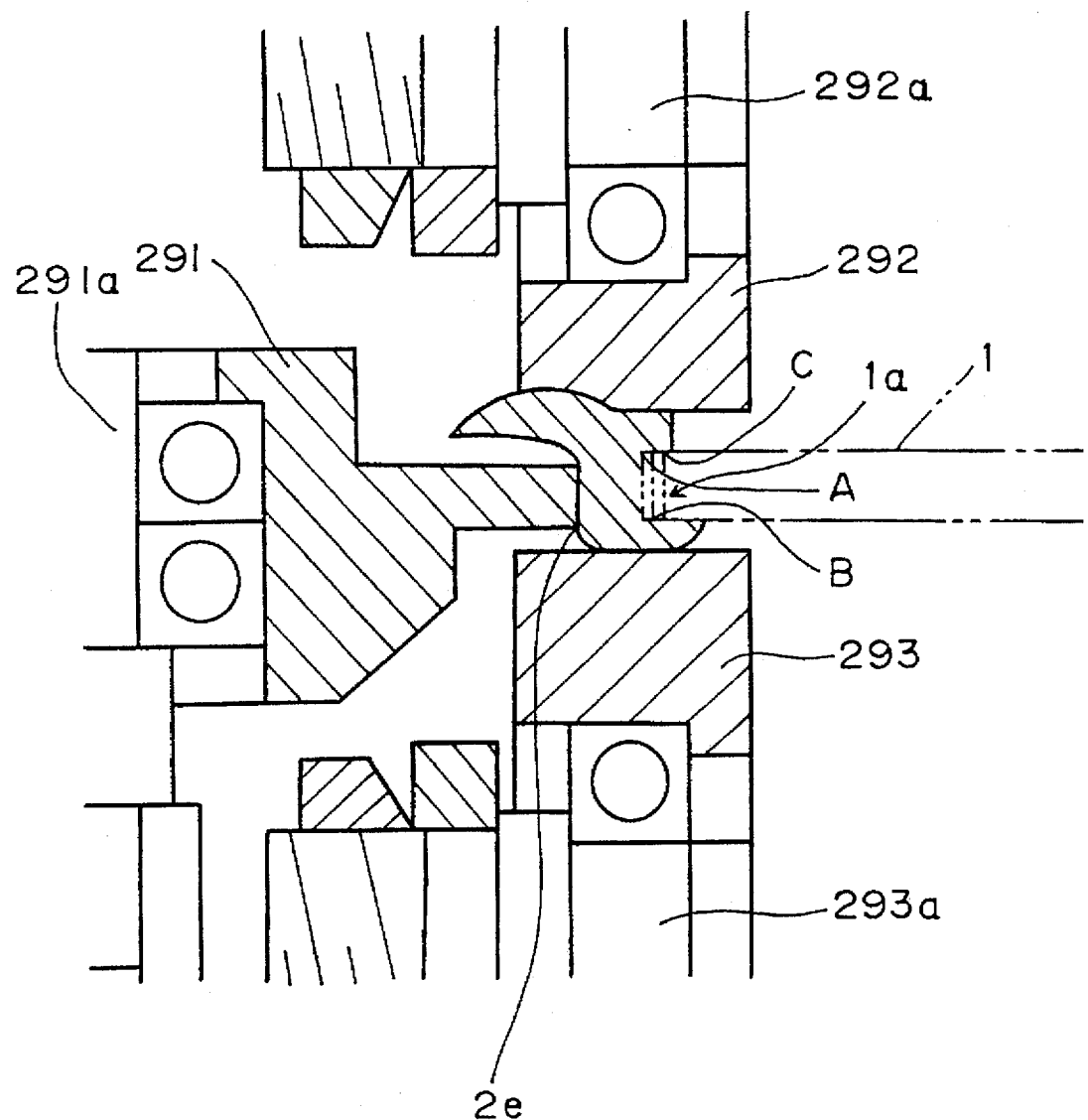
FIG. 23B is an enlarged sectional view showing the portion A in FIG. 23A.

As shown by reference symbols A, B and C in FIG. 23B, the horizontal position of the edge 1a of the glazing 1 varies depending on the machining accuracy of the glazing 1 and the positional accuracy of the robot 4. The accuracy of the glazing 1 with the molding 2 depends on the profile accuracy of the peripheral portion 2e of the molding 2. Accordingly, the horizontal roller 291 is advanced to a predetermined constant position, and the peripheral surface of the horizontal roller 291 is used to guarantee the accuracy of the peripheral portion 2e. In the case where the edge 1a of the glazing 1 is located at the position A, the molding 2 is excessively compressed in the lateral direction, whereby a portion of the molding 2 is squeezed out from the area between the horizontal roller 291 and the edge 1a of the glazing 1. Such a portion thus squeezed out is released to clearances between the upper and lower vertical rollers 292 and 293, and the horizontal roller 291 and the glazing 1. Accordingly, no problem arises. In the case where the edge 1a of the glazing 1 is located at the position C, a clearance is produced between the bottom of the groove 2a of the molding 2 and the edge 1a of the glazing 1. However, no problem occurs in terms of bonding strength, because the groove 2a has a sufficient depth. In normal cases, the edge 1a of the glazing 1 is located at the position B, and problems do not occur at all. The positional accuracy of the glazing 1 in the vertical direction is sufficiently guaranteed by the glazing support section 310 which will be described below.

As shown in FIG. 23A, the glazing support section 310 is mainly composed of an upper support roller 312, and a lower support roller 313. The upper support roller 312 is rotatably supported by a shaft 312a parallel to the base plate 211 such that the roller 312 is located on the upper side of the glazing 1. The lower support roller 313 is rotatably supported by a shaft 313a parallel to the base plate 211 such that the roller 313 is located on the lower side of the glazing 1. The shaft 312a of the upper support roller 312 is fixed to an upper bracket 317. The upper bracket 317 is connected to the cylinder 319 which is fixed to an upper fixing bracket 321. The upper fixing bracket 321 is fixed directly to the base plate 211. Similarly, the shaft 313a of the lower support roller 313 is fixed to a lower bracket 318. The lower bracket 318 is connected to the cylinder 320 which is fixed to a lower fixing bracket 322. The lower fixing bracket 322 is fixed directly to the base plate 211. Although the upper and lower support rollers 312 and 313 are supported by the base plate 211 via the upper and lower fixing brackets 321 and 322 in the present embodiment, the upper and lower fixing brackets 321 and 322 may be fixed to the upper and lower columns 301 and 302.

When the movable member 294 is located at its retracted position, the cylinders 319 and 320 are in their contracted states. In this initial state, the upper support roller 312 is located at its raised position, and the lower support roller 313 is located at its lowered position. After the movable member 294 is advanced toward the glazing 1, the cylinders 319 and 320 are operated, so that the upper support roller 312 is lowered and the lower support roller 313 is raised. With this operation, the glazing 1 is pressed from its upper and lower sides so that the glazing 1 is held at a constant vertical position. Accordingly, the problem of deformation of the glazing 1 due to positioning errors of the robot 4 can be solved. It is preferred to make the horizontal positions of the upper and lower support rollers 312 and 313 as close to the pressing section 290 as possible.

Moreover, a second proximity switch LS2' is disposed between the third guide section 280 and the pressing section 290. The proximity switch LS2' detects whether the leading end of the molding 2 enters the pressing section 290.

Figure 24A:
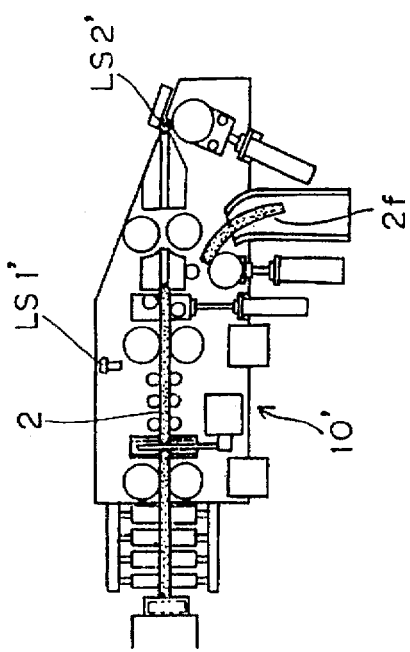
FIGS. 24A through 24D are plan views showing the operation of the molding attaching apparatus according the second embodiment.
Figure 24B:
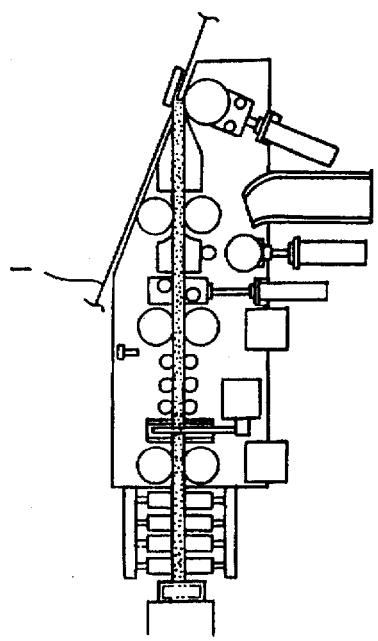
Figure 24C:
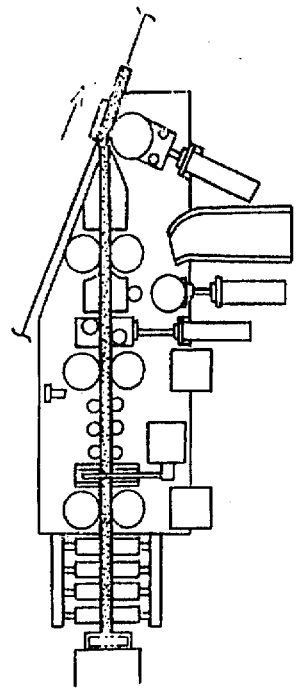
Figure 24D:
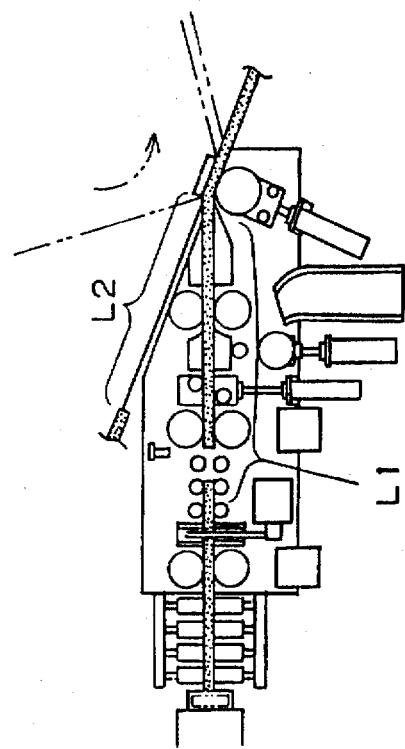
Figure 25A:
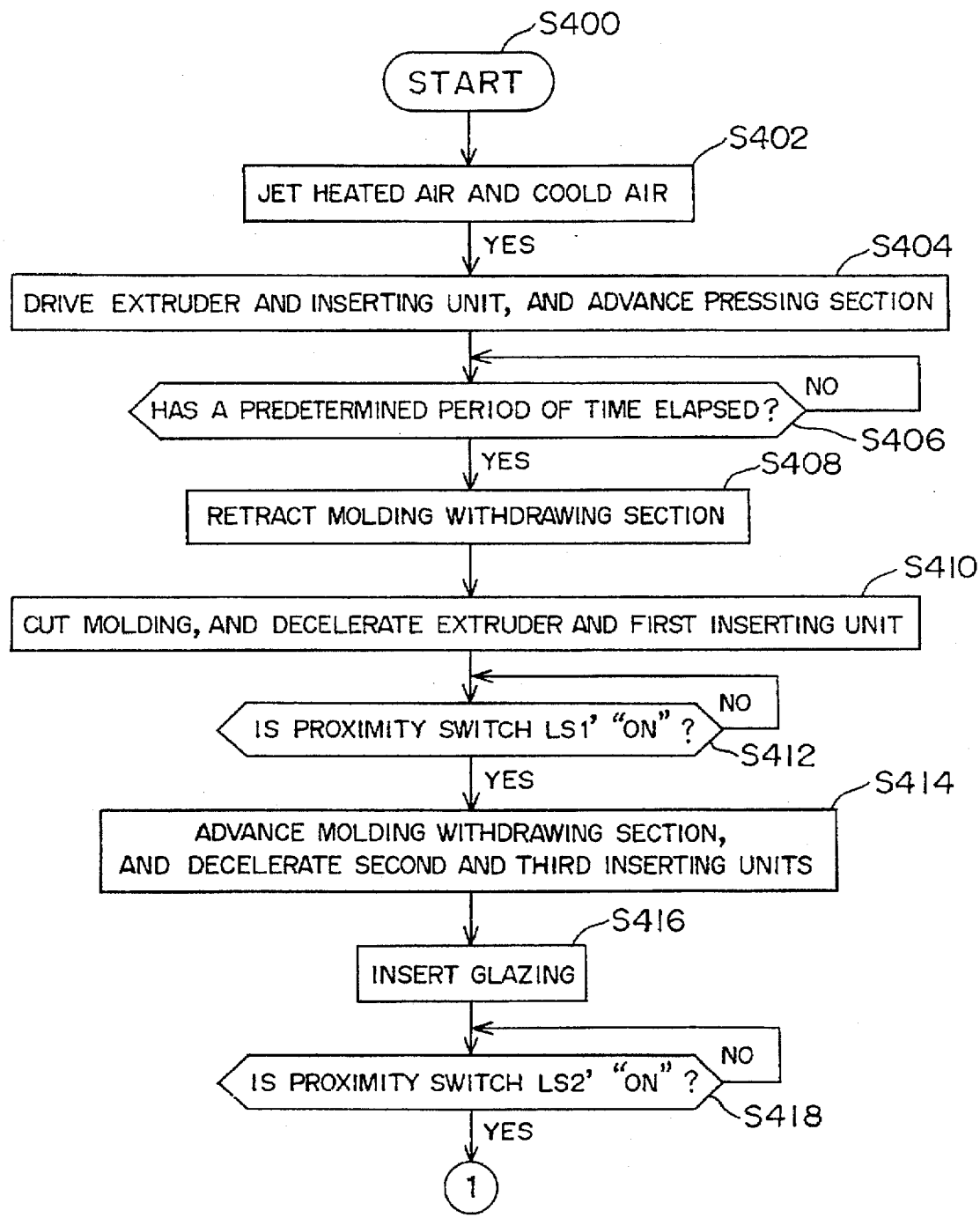
FIGS. 25A and 25B are flowcharts showing the operation of the molding attaching apparatus according to the second embodiment.
Figure 25B:
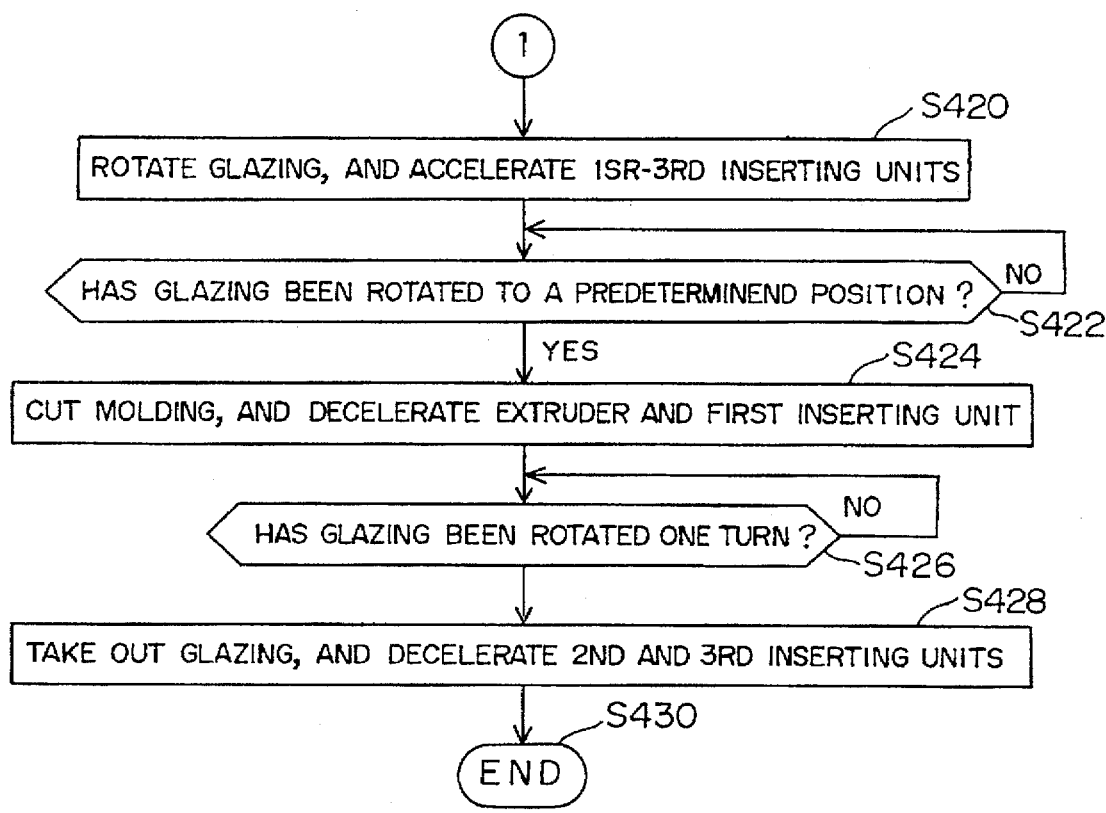

The operation of the above-described molding attaching apparatus according to the present embodiment will be described with reference to the plan views of FIGS. 24A through 24D and the flowcharts shown in FIGS. 25A and 25B.

Before starting an automatic operation for the attachment of the molding 2, a worker must perform an initial setup of the attaching head 10'. In detail, the worker inserts the leading end of the molding 2 into the inserting unit 220 and then into the block 233 of the cutting unit 230. It is preferred that the extrusion speed of the extruder 5 at this time be slower than the ordinary speed for attachment. After the initial setup, the worker temporarily stops the extruder 5. In such a state, the support section 254 of the molding drawing section 251 is located at its advanced position to allow the molding 2 to advance along an ordinary path. Also, the horizontal roller 291, the upper vertical roller 292, and the lower vertical roller 293 are all located at their retracted positions.

In this state, the worker presses an unillustrated start switch to supply a start signal to the controller 7, so that an automatic operation (step 400).

In step 402, the air-supply unit 266, the air heating unit 264, and the air cooling unit 267 are operated, so that the heated air and the cooled air are simultaneously jetted from the second guide section 260 and the third guide section 280, respectively. In detail, heated air is jetted from the hot air supply paths 263 and 283 of the first rails 261 and 281, while cooled air is jetted from the cool air supply paths 265 and 285 of the second rails 262 and 282.

In step 404, the extruder 5 and the inserting units 220, 240 and 270 are operated so that the extrusion and the conveyance of the molding 2 are started at speeds corresponding to a preset extrusion speed suitable for the attachment of the molding 2. This extrusion speed is determined based on the peripheral speed of the glazing 1 which is rotated by the robot 4. The extrusion speed of the extruder 5 is set substantially equal to he insertion or conveyance speed of the inserting units 220, 240 and 270. Simultaneously, the rotation of the roller 258 of the molding ejecting unit 250 is started. Also, the horizontal roller 291 of the pressing section 290 is advanced.

In step 406, it is judged whether a predetermined period of time has elapsed after the extrusion of the molding 2 was started in step 404. This waiting step is provided for allowing the molding ejecting unit 250 to eject the leading portion of the molding 2, which portion is formed immediately after starting the extrusion and therefore is not suitable for being attached to the glazing 1. In detail, when it is judged that a predetermined period of time has elapsed after the extrusion of the molding 2 had been started (i.e., the result of the judgment is "YES"), it means that the leading end of the molding 2 reaches the molding withdrawing section 251 of the molding ejecting unit 250. In such a case, the operation moves to step 408 so as to retract the support section 254 of the molding withdrawing section 251. With this operation, the direction of the molding 2 is changed from its ordinary direction to a direction toward the chute 253. Thereafter, the roller 257 of the molding holding section 252 is advanced to hold and guide the molding 2 while conveying the molding 2 to the chute 253. In the case where it is judged that the predetermined period of time has not elapsed (the result of the judgment is "NO") the waiting state is continued in this step.

In step 410, the molding 2 is cut by the cutting unit 230, and the operational speeds of the extruder 5 and the first inserting unit 220 are decreased to a predetermined speed. Due to this operation, a gap is formed at the portion where the molding 2 is cut. When it is judged, in step 412, that the proximity switch LS1' has detected the gap, i.e. that the proximity switch LS1' is "ON" (the result judgment of is "YES"), it means that the leading end of a portion of the molding 2 which follows the leading portion 2f of the molding 2 reaches a position corresponding to the proximity switch LS1', and that the leading portion 2f of the molding 2 to be ejected mostly enter the chute 253. In such a case, the support section 254 of the molding withdrawing section 251 of the molding ejecting unit 250 is advanced to return the moving direction of the molding 2 to the ordinary direction. In the same time, the roller 257 of the molding holding section 252 is retracted to complete the operation for ejecting the leading portion 2f of the molding 2 (the state shown in FIG. 24A, step 414). At this time, the operational speeds of the second and third inserting units 240 and 270 are decreased to a predetermined speed equal to the speed of the first inserting unit 220 set in step 410. When it is judged, in step 412, that the proximity switch LS1' has not detected the gap (the result of judgment is "NO"), the waiting operation is effected in the step 412.

While the above-described operational steps are carried out, the operation of the robot 4 is started. The robot 4 holds the glazing 1 on an unillustrated workpiece table using the sucker 4a. The robot 4 then inserts the edge of the glazing 1 into the pressing section 290, and goes into a waiting state. In a separate step, primer is previously applied to the periphery of the glazing 1 where the molding 2 is attached. At this time, the upper vertical roller 292 and the lower vertical roller 293 of the pressing section 290 are advanced for pressing the molding 2. Simultaneously, the upper support roller 312 and the lower support roller 313 of the glazing support section 310 are advanced for supporting the glazing 1.

In step 418, it is judged whether the proximity switch LS2' is "ON". If the proximity switch LS2' is "ON", it means that the leading end of the molding 2 has approached the glazing 1 after passing through the second guide section 260, the third inserting unit 270 and the third guide section 280. When an affirmative judgment is made, the robot 4 is operated in step 420 to rotate the glazing 1 at a preset peripheral speed. At the same time, the operational speeds of the extruder 5 and the first, second and third inserting units 220, 240, and 270 are increased to a predetermined speed (the state shown in FIG. 23B).

The molding 2 is then continuously attached along the periphery of the glazing 1, while the glazing 1 is rotated by the movement of the robot 4. In detail, the molding 2 extruded from the extruder 5 is inserted into the attaching head 10' and is conveyed by the inserting units 220, 240 and 270. The molding 2 is heated from its attaching side and is cooled from its non-attaching side by heated air and cooled air jetted from the second guide section 260 and the third guide section 280. Accordingly, the molding 2 has a high plasticity at the attaching side having the groove 2a. Therefore, the groove 2a is smoothly expanded by the change in the thickness of the third guide section 280. Since the plasticity is lowered at the non-attaching side (the side opposite to the groove 2a), the shape of the lip 2b is prevented from deteriorating. In addition to maintaining the plasticity of the molding 2 in an optimal state, the heated air and cooled air form layers of air between the second guide section 260 and the molding 2 and between the third guide section 280 and the molding 2, thereby realizing smooth passing of the molding 2.

As the glazing 1 is rotated in step 420, the edge of the glazing 1 enters the groove 2a of the molding 2 in the pressing section 290. In detail, the molding 2 is pressed by the horizontal roller 291 in a horizontal direction, by the upper vertical roller 292 from the upper side, and by the lower vertical roller 293 from the lower side. The molding 2 is gradually attached along the peripheral edge of the glazing 1 in this manner (the state shown in FIG. 24C). The extrusion speed and conveying speeds of the extruder 5, and the first, second and third inserting units 220, 240 and 270 are set equal to he peripheral speed of the glazing 1, or slightly lower than the peripheral speed of the glazing 1 so as to apply a slight tension to the molding 2.

In the above-described manner, the attachment of the molding 2 gradually proceeds. When it is judged that the leading end of the molding 2 reaches a predetermined position, i.e., it is judged that the attachment of the molding 2 is completed to a predetermined position (step 422), the cutting unit 230 is driven to cut the molding 2, and the operational speeds of the extruder 5 and the first inserting unit 220 are decreased to a predetermined speed (step 424). When the leading end of the molding 2 reaches the predetermined position, the length L2 of the portion the periphery of the glazing 1 where the molding 2 has not been attached becomes equal to the distance L1 from the cutting unit 230 to the point where the molding 2 contacts the glazing 1 in the pressing section 290, as shown in FIG. 24D. This state is indirectly detected by detecting that the hand of the robot 4 reaches a predetermined teaching point. Alternatively, this state can be detected with an unillustrated non-contact limit switch which detects that the leading end of the molding 2 reaches the predetermined position.

Even after the molding 2 is cut, the molding 2 is fed as the glazing 1 rotates. With this operation, the attaching operation has performed up to the tailing end of the molding 2.

In step 426, it is judged whether glazing 1 rotates one turn. This judgment can be made by detecting whether the hand of the robot 4 rotates by an angle which is preset by a teaching operation. When it is judged that the glazing 1 rotates one turn, the operation moves to step 428 in which the robot 4 takes out the glazing 1. At the same time, the operational speeds of the second and third inserting units 240 and 270 are decreased to a predetermined speed. With this operation, the attaching of the molding 2 for a single glazing 1 is completed. When the attaching operation is continued, after resetting the various units and sections into their initial states, the operation moves back to the step 402.

With the above-described operation, the molding 2 is automatically attached to the periphery of the glazing 1. In the molding attaching apparatus according to the present embodiment, the molding 2 is attached to the glazing 1 in a state in which the molding 2 has not hardened completely and is soft, although it has been formed in a predetermined shape. Accordingly, the molding flexibly conforms to the arcuate shape at the four corners of the glazing. As described above, although the attaching side of the molding 2 is heated to increase the plasticity, the non-attaching side of the molding 2 is cooled to decrease the plasticity for maintaining the shape of the molding 2. Accordingly, the shape of the molding 2 can be prevented from deteriorating. In the case where the molding 2 is adhered to the glazing 1 via primer, the adhesive force can be increased because of an increased temperature of the attaching portion of the molding 2.

In the above-described embodiment, the hot air supply paths 263 and 283 are formed in the first rails 261 and 281 of the second and third guide sections 260 and 280, while the cool air supply paths 265 and 288 are formed in the second rails 262 and 282 of the second and third guide sections 260 and 280. However, it is not necessarily needed to supply heated air and cooled air from the inside of the second and third guide sections 260 and 280, and it is possible to supply heated air and cooled air from the outside of the second and third guide sections 260 and 280.

Although the molding is heated and cooled using air in the above-described embodiment, the molding may be electrically heated. In other words, heating wires are passed through the first rails 261 and 281 of the second and third guide sections 260 and 280 so as to heat the first rails 261 and 281, thereby heating the molding. To cool the molding, cooling water may be passed through the second rails 262 and 282 of the second and third guide sections 260 and 280.

Figure 4:
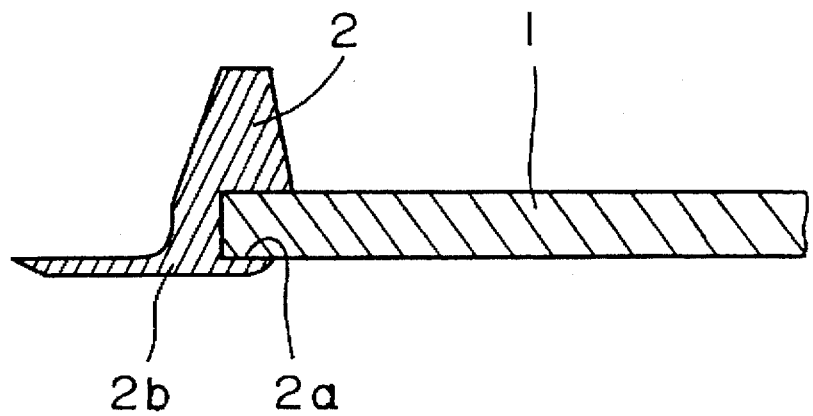
FIG. 4 is a sectional view showing the shape of a molding used in the present invention.

In the above-described embodiment, the molding 2 has a groove 2a as the attaching portion to cover the edge of the glazing 1, as shown in FIG. 4. However, the shape of the molding 2 is not limited to this shape and may be modified to have an attaching portion 2c which exposes one side of the glazing 1 to the outside, as shown in FIG. 5.

In the above-described embodiment, an extruder used as a molding supply apparatus supplies a not-hardened molding immediately after extrusion. However, the embodiment may be modified to supply the attaching head with a hardened molding. In this case, the attaching side of the molding is sufficiently heated for adhesion to the glazing, while the non-attaching side is cooled. When the molding is previously cut in a length equal to the peripheral length of the glazing, the cutting unit may be omitted.

Obviously, numerous modifications and variations of the present invention are possible in light of the above teachings. It is therefore to be understood that within the scope of the appended claims, the present invention may be practiced otherwise than as specifically described herein.

What is claimed is:

1. An apparatus for attaching a molding to an article, the apparatus comprising:

an extruder for supplying a molding having an attaching portion to be adhered to an edge of an article;

an inserting unit for feeding the molding toward the article at a controlled speed;

a cutting unit for cutting said molding:

a guiding means for leading said molding to a predetermined position so that a leading end of the attaching portion of said molding contacts the edge of said article at an attachment start position;

a pressing means for applying pressure to said molding such that the attaching portion of said molding adheres to the edge of said article;

a moving for moving said article such that said molding is attached along the edge of said article; and means for reducing operational speeds of the extruder and the inserting unit;

wherein said molding is made of a resin, and said apparatus further comprises:

heating means provided in said guiding means for heating one side of said molding where the attaching portion is provided; and cooling means provided in said guiding means for cooling the opposite side of said molding.

2. An apparatus for attaching a molding to an article according to claim 1, wherein the attaching portion of said molding is formed with a groove for receiving the edge of said article.

3. An apparatus for attaching a molding to an article according to claim 2, said guiding means further comprising:

a guide section adapted to gradually expand the groove to a width which is greater than a thickness of the edge of said article before the attaching portion engages with the edge of said article.

4. An apparatus for attaching a molding to an article according to claim 1, wherein said moving means is an industrial robot.

5. An apparatus for attaching a molding to an article according to claim 1, wherein said means for reducing reduces the operational speeds of said extruder and said inserting unit for an interval from the time when said cutting unit is operated to the time when an attaching operation is started for a next subsequent article.

6. An apparatus for attaching a molding to article according to claim 1, further comprising a mechanism which ejects a leading part of said molding before an attachment operation is started.

7. An apparatus for attaching a molding to an article according to claim 1, wherein said article is a glazing for an automobile.

* * * * *